United States Patent
LeGendre et al.

(10) Patent No.: US 12,530,744 B2
(45) Date of Patent: Jan. 20, 2026

(54) PHOTO RELIGHTING AND BACKGROUND REPLACEMENT BASED ON MACHINE LEARNING MODELS

(71) Applicant: Google LLC, Mountain View, CA (US)

(72) Inventors: Chloe LeGendre, Culver City, CA (US); Paul Debevec, Culver City, CA (US); Sean Ryan Francesco Fanello, San Francisco, CA (US); Rohit Kumar Pandey, Mountain View, CA (US); Sergio Orts Escolano, San Francisco, CA (US); Christian Haene, Berkeley, CA (US); Sofien Bouaziz, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 167 days.

(21) Appl. No.: 18/554,960

(22) PCT Filed: Apr. 28, 2021

(86) PCT No.: PCT/US2021/029634
§ 371 (c)(1),
(2) Date: Oct. 11, 2023

(87) PCT Pub. No.: WO2022/231582
PCT Pub. Date: Nov. 3, 2022

(65) Prior Publication Data
US 2024/0212106 A1   Jun. 27, 2024

(51) Int. Cl.
*G06T 5/50* (2006.01)
*G06T 7/194* (2017.01)
(Continued)

(52) U.S. Cl.
CPC ............... *G06T 5/50* (2013.01); *G06T 7/194* (2017.01); *G06V 10/56* (2022.01); *G06V 10/60* (2022.01);
(Continued)

(58) Field of Classification Search
None
See application file for complete search history.

(56) References Cited

U.S. PATENT DOCUMENTS

| 2015/0043806 A1 | 2/2015 | Karsch et al. |
| 2017/0262962 A1 | 9/2017 | Rad et al. |

(Continued)

FOREIGN PATENT DOCUMENTS

| WO | 2020/068158 | 4/2020 |

OTHER PUBLICATIONS

Wang, Zhibo, et al. "Single image portrait relighting via explicit multiple reflectance channel modeling." ACM Transactions on Graphics (ToG) 39.6 (2020): 1-13. (Year: 2020).*

(Continued)

*Primary Examiner* — Nurun Flora
(74) *Attorney, Agent, or Firm* — McDonnell Boehnen Hulbert & Berghoff LLP

(57) ABSTRACT

Apparatus and methods related to applying lighting models to images are provided. An example method includes receiving, via a computing device, an image comprising a subject. The method further includes relighting, via a neural network, a foreground of the image to maintain a consistent lighting of the foreground with a target illumination. The relighting is based on a per-pixel light representation indicative of a surface geometry of the foreground. The light representation includes a specular component, and a diffuse component, of surface reflection. The method additionally includes predicting, via the neural network, an output image (Continued)

comprising the subject in the relit foreground. One or more neural networks can be trained to perform one or more of the aforementioned aspects.

21 Claims, 22 Drawing Sheets
(17 of 22 Drawing Sheet(s) Filed in Color)

(51) Int. Cl.
  *G06V 10/56* (2022.01)
  *G06V 10/60* (2022.01)
  *H04N 5/272* (2006.01)
(52) U.S. Cl.
  CPC ... *H04N 5/272* (2013.01); *G06T 2207/20221* (2013.01)

(56) References Cited

U.S. PATENT DOCUMENTS

| | | | |
|---|---|---|---|
| 2018/0253869 | A1 | 9/2018 | Yumer et al. |
| 2018/0359416 | A1 | 12/2018 | Hold-Geoffroy et al. |
| 2019/0164261 | A1 | 5/2019 | Sunkavalli et al. |
| 2019/0340810 | A1 | 11/2019 | Sunkavalli et al. |
| 2020/0074674 | A1 | 3/2020 | Guo et al. |
| 2020/0153385 | A1 | 5/2020 | Vincent et al. |
| 2020/0273237 | A1 | 8/2020 | Sunkavalli et al. |
| 2020/0311946 | A1* | 10/2020 | Price ..................... G06T 7/136 |
| 2020/0372284 | A1 | 11/2020 | Rhemann et al. |

OTHER PUBLICATIONS

International Searching Authority, International Search Report and Written Opinion mailed on Jan. 25, 2022, issued in connection with International Patent Application No. PCT/US2021/0296354, filed Apr. 28, 2021, 11 pages.
Nestmeyer et al., "Learning Physics—guided Face Relighting under Directional Light," CVPR, 2020, 10 pages.
Sun et al., "Single Image Portrait Relighting," ACM Trans. Graph., arXiv:1905.00824v1, 2019, 12 pages, vol. 38, No. 4, Article 79.
Tsai et al., "Portrait Light: Enhancing Portrait Lighting with Machine Learning," Google Research, Blog, Dec. 11, 2020, 9 pages.
Wang et al., "Single Image Portrait Relighting via Explicit Multiple Reflectance Channel Modeling," ACM Transactions on Graphics, Nov. 26, 2020, 13 pages, vol. 39, No. 6.
Agusanto et al., "Photorealistic rendering for augmented reality using environment illumination," Proceedings of the Second IEEE and ACM International Symposium on Mixed and Augmented Reality, Conference Paper, IEEE, 2023, 10 pages.
Chen et al., "Live HDR+ and Dual Exposure Controls on Pixel 4 and 4a," Google AI Blog, Aug. 3, 2020, 8 pages.
Debevec et al., "Acquiring the Reflectance Field of a Human Face," SIGGRAPH 2000 Conference Proceedings, Jul. 2000, 12 pages.
Devries et al. "Learning Confidence for Out—0f-Distribution Detection in Neural Networks," arXiv:1802.04865v1, Feb. 13, 2018, 12 pages.
Hu et al., "FC'4: Fully Convolutional Color Constancy with Confidence-Weighted Pooling," IEEE Conference on Computer Vision and Pattern Recognition, 2017, pp. 330-339, XP033249369.
International Searching Authority, International Search Report and Written Opinion mailed Jul. 29, 2019, issued in connection with International Patent Application No. PCT/US2019/025205, filed Apr. 1, 2019, 15 pages.
International Searching Authority, International Search Report and Written Opinion mailed on Sep. 8, 2021, issued in connection with International Patent Application No. PCT/US2021/032734, filed on May 17, 2021, 17 pages.
International Searching Authority, International Search Report and Written Opinion mailed on Jan. 25, 2022, issued in connection with International Patent Application No. PCT/US2021/029634, filed Apr. 28, 2021, 11 pages.
International Searching Authority, International Search Report and Written Opinion mailed on Jun. 28, 22, issued in connection with International Patent Application No. PCT/US2021/071986, filed Oct. 22, 2021, 15 pages.
Legendre et al., "Learning Illumination from Diverse Portraits," arXiv:2008.02396v1, Aug. 5, 2020, 14 pages.
Pandey et al., "Total Relighting: Learning to Relight Portraits for Background Replacement," ACM Transactions on Graphics, 2021, 21 pages, vol. 40, No. 4, Article 1.
Shashua et al., "The Quotient Image: Class-Based Re-rendering and Recognition With Varying Illuminations," IEEE Transactions on Pattern Analysis and Machine Intelligence, IEEE Computer Society, USA, Feb. 2001, pp. 129-139, vol. 23, No. 2.
Wang et al., "Face Relighting from a Single Image under Arbitrary Unknown Lighting Conditions," IEEE Transactions on Pattern Analysis and Machine Intelligence, Nov. 2009, pp. 1968-1984, vol. 31, No. 11.
Wen et al., "Face Relighting with Radiance Environment Maps," Proceedings of the 2003 IEEE Computer Society Conference on Computer Vision and Pattern Recognition, Jun. 2003, pp. 158-165, vol. 2.
Wu et al., "One-shot Deep Neural Network for Pose and Illumination Normalization Face Recognition," 2016 IEEE Conference on Multimedia and Expo (ICME), IEEE, Jul. 2016, 6 pages.
Xu et al., "Deep Image-Based Relighting from Optimal Sparse Samples," ACM Transactions on Graphics, 2018, 13 pages, vol. 37, No. 4, Article 126.
Zhang et al., "Portrait Shadow Manipulation," arXiv:2005.008925v2, ACM Transactions on Graphics, 2020, 14 pages, vol. 39, No. 4, Article 78.
Zhang, Richard, "Making Convolutional Networks Shift-Invariant Again," arXiv:1904.11486v2, Jun. 9, 2019, 17 pages.

* cited by examiner

⤺2200

2210 Receiving, via a computing device, an image comprising a subject

2220 Relighting, via a neural network, a foreground of the image to maintain a consistent lighting of the foreground with a target illumination. The relighting is based on a per-pixel light representation indicative of a surface geometry of the foreground. The light representation includes a specular component, and a diffuse component, of surface reflection.

2230 Predicting, via the neural network, an output image comprising the subject in the relit foreground

FIG. 22

PHOTO RELIGHTING AND BACKGROUND REPLACEMENT BASED ON MACHINE LEARNING MODELS

This application is a national stage application under 35 U.S.C. § 371 of International Application No. PCT/US2021/029634, filed Apr. 28, 2021, the disclosure of which is explicitly incorporated by reference herein in its entirety.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct or otherwise modify captured images. For example, some image capture devices can provide "red-eye" correction that removes artifacts such as red-appearing eyes of people and animals that may be present in images captured using bright lights, such as flash lighting. Also, for example, some image capture devices can provide image editing features such as relighting to modify the lighting in an image. After a captured image has been corrected and/or edited, the modified image can be saved, displayed, transmitted, printed to paper, and/or otherwise utilized.

Compositing an individual into a background scene is a common practice, for example, in filmmaking, video conferencing. Such compositing is generally performed in controlled studio settings, and involves expert knowledge of the equipment, lighting, and so forth. Also, for example, compositing is sometimes based on a fixed background. In some instances, a foreground image may be superimposed onto different backgrounds. However, the foreground lighting is generally not consistent with the background lighting, and/or boundary details of objects in the foreground may be blurred, resulting in an unrealistic composition.

Mobile phone users generally don't have access to such specialized studio resources, or knowledge of how to use these resources. However, users may prefer to have access to realistic, professional, and high-quality image relighting and compositing features.

SUMMARY

In one aspect, a computing device, such as an image capture device, may be configured to perform a foreground relighting task. Powered by a system of machine-learned components, the computing device may be configured to enable users to create attractive relighting for portraits or other types of images. For example, the computing device may be configured to relight a foreground of an image so that the lighting is consistent with a target background. Also, for example, the computing device may be configured to enable users to replace backgrounds in existing images and create realistic composite images. In some aspects, the computing device may be configured to learn to recover a robust alpha channel and foreground colors to effectively create a compositing for background replacement in images. The background replacement may include matting and foreground relighting. For example, the computing device may be configured to separate a foreground from a background for an arbitrary input image.

In order to perform such functions, the computing device may be configured to utilize one or more intermediate outputs of a machine learning model for model training supervision. A "pixel-aligned" lighting representation can be utilized that takes a target lighting environment and maps it directly into a coordinate space of a target image. Such a lighting representation may be based on computer graphics rendering techniques, such as, for example a diffuse convolution operation, and one or more specular convolution operations. The lighting representation, as described herein, is suitable for U-net type neural network architectures, where a spatial alignment of inputs is of high significance. One of the advantages of this lighting representation is that there is no longer a need to learn a complicated mapping from a representation of lighting environment coordinates to a representation of image coordinates. Another advantage of the lighting representation is to enable the relighting model to generate complex non-Lambertian reflectance while correctly inferring lower-frequency color and shading under the target illumination.

Although certain aspects of foreground estimation, relighting, and/or compositing may be generally applied independently, methods disclosed herein combine these techniques into a unified framework, and eliminate a need for additional inputs such as, for example, known background or known illumination, specialized acquisition techniques, and so forth. As described herein, a machine learning model can be trained on relit images of subjects captured in a light stage computational illumination system, which can record a plurality of lighting conditions, high quality geometry, and/or accurate alpha mattes. A per-pixel lighting representation in a deep learning framework may be utilized to model diffuse and specular components of a subject's appearance.

In some aspects, mobile devices may be configured with these features so that an image can be enhanced in real-time. Also, for example, the described methods can be applied to in-the-wild images, including images in video content. In some instances, an image may be automatically enhanced by the mobile device. In other aspects, mobile phone users can non-destructively enhance an image to match their preference. Also, for example, pre-existing images in a user's image library can be enhanced based on techniques described herein.

In one aspect, a computer-implemented method is provided. The method includes receiving, via a computing device, an image comprising a subject. The method further includes relighting, via a neural network, a foreground of the image to maintain a consistent lighting of the foreground with a target illumination. The relighting is based on a per-pixel light representation indicative of a surface geometry of the foreground. The light representation includes a specular component, and a diffuse component, of surface reflection. The method also includes predicting, via the neural network, an output image comprising the subject in the relit foreground.

In another aspect, a computing device is provided. The computing device includes one or more processors and data storage. The data storage has stored thereon computer-executable instructions that, when executed by one or more processors, cause the computing device to carry out functions. The functions include receiving, via a computing device, an image comprising a subject. The functions further include relighting, via a neural network, a foreground of the image to maintain a consistent lighting of the foreground with a target illumination. The relighting is based on a per-pixel light representation indicative of a surface geometry of the foreground. The light representation includes a specular component, and a diffuse component, of surface reflection. The functions also include predicting, via the neural network, an output image comprising the subject in the relit foreground.

In another aspect, an article of manufacture is provided. The article of manufacture includes one or more computer readable media having computer-readable instructions stored thereon that, when executed by one or more processors of a computing device, cause the computing device to carry out functions. The functions include receiving, via a computing device, an image comprising a subject. The functions further include relighting, via a neural network, a foreground of the image to maintain a consistent lighting of the foreground with a target illumination. The relighting is based on a per-pixel light representation indicative of a surface geometry of the foreground. The light representation includes a specular component, and a diffuse component, of surface reflection. The functions also include predicting, via the neural network, an output image comprising the subject in the relit foreground.

In another aspect, a system is provided. The system includes means for receiving, via a computing device, an image comprising a subject; means for relighting, via a neural network, a foreground of the image to maintain a consistent lighting of the foreground with a target illumination, wherein the relighting is based on a per-pixel light representation indicative of a surface geometry of the foreground, and wherein the light representation comprises a specular component, and a diffuse component, of surface reflection; and means for predicting, via the neural network, an output image comprising the subject in the relit foreground.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

The patent or application file contains at least one drawing executed in color. Copies of this patent or patent application publication with color drawings will be provided by the Office upon request and payment of the necessary fee.

FIG. 22 is a flowchart of a method, in accordance with example embodiments.

DETAILED DESCRIPTION

Overview

Figure 1:
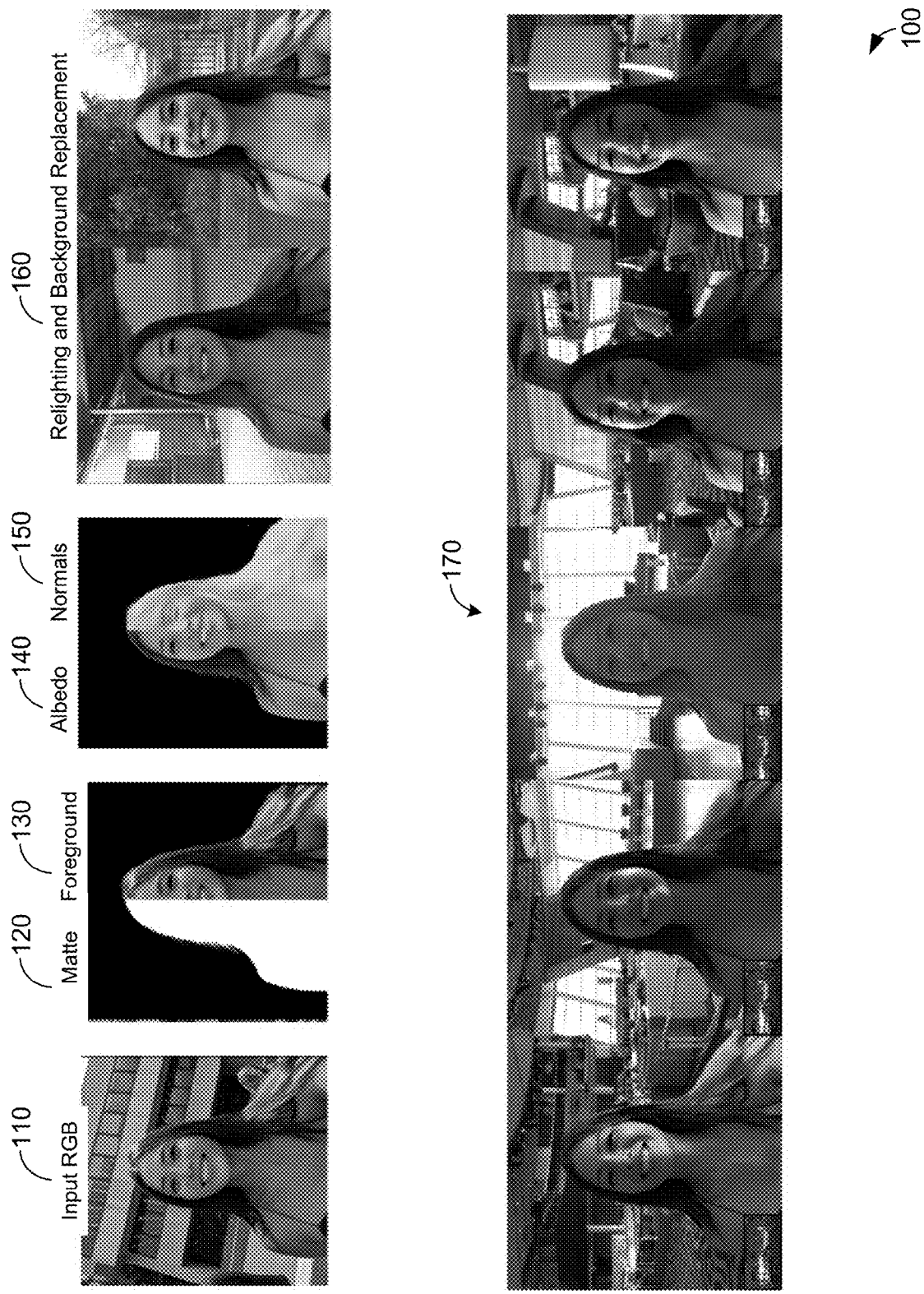
FIG. 1 illustrates images with an overview of the relighting framework, in accordance with example embodiments.

This application relates to enhancing an image of an object, such as an object depicting a human face, using machine learning techniques, such as but not limited to neural network techniques. The application also relates to replacing a background in an image with a target background. When a mobile computing device user takes an image of an object, such as a person, the resulting image may not always have ideal lighting. For example, the image could be too bright or too dark, the light may come from an undesirable direction, or the lighting may include different colors that give an undesirable tint to the image. Further, even if the image does have a desired lighting at one time, the user might want to change the lighting at a later time. As such, an image-processing-related technical problem arises that involves adjusting lighting of an already-obtained image.

Also, for example, a mobile computing device user may capture an image of an object in an initial background, and edit the image to replace the initial background with a target background. Accordingly, another image-processing-related technical problem arises that involves adjusting a foreground lighting to be consistent with a background illumination of an initial background, and/or a target background. Also, for example, the image-processing-related technical problem involves maintaining high-frequency boundary details, and accurately synthesizing a subject's appearance as lit, to produce a realistic composite image for any desired background.

To allow user control of lighting of images, particularly images of human faces, the herein-described techniques apply a model based on a convolutional neural network to adjust lighting of images, and/or enable background replacement. The herein-described techniques include receiving an input image, performing foreground estimation via alpha matting, foreground relighting, and/or compositing, and predicting an output image that includes the input image in a relit foreground, using the convolutional neural network. The input and output images can be high-resolution images, such as multi-megapixel sizes images captured by a camera of a mobile computing device. The convolutional neural network can work well with input images captured under a variety of natural and artificial lighting conditions. In some examples, a trained model of the convolutional neural network can work on a variety of computing devices, including but not limited to, mobile computing devices (e.g., smart phones, tablet computers, cell phones, laptop computers), stationary computing devices (e.g., desktop computers), and server computing devices.

A neural network, such as a convolutional neural network, can be trained using a training data set of images to perform one or more aspects as described herein. In some examples, the neural network can be arranged as an encoder/decoder neural network.

While examples described herein relate to determining and applying a light representation of surface reflection of images of objects with human faces, the neural network can be trained to determine and apply lighting models to images of other objects, such as objects that reflect light similarly to human faces. Human faces typically reflect light diffusely but can also include some specular highlights due to directly reflected light. For example, specular highlights can result from direct light reflections from eye surfaces, glasses, jewelry, etc. In many images of human faces, such specular highlights are relatively small in area in proportion to areas of facial surfaces that diffusely reflect light. Thus, the neural network can be trained to apply light representation models to images of objects that diffusely reflect light, and include specular highlights. The images in the training data set can show one or more particular objects using lighting provided under a plurality of different conditions, such as lighting provided from different directions, lighting provided of varying intensities (e.g. brighter and dimmer lighting), lighting provided with light sources of different colors, lighting provided with different numbers of light sources, etc.

A trained neural network can process the input image to predict a reflectance field indicative of an appearance of the subject. Also, for example, based on the foreground and the surface geometry, the trained neural network can process the input image to predict a per-pixel albedo image. As another example, the trained neural network can process the input image to predict a plurality of per-pixel surface normal representation. The trained neural network can also process the image to predict a relighting of the foreground, compositing the relit foreground into a target background. Then, the trained neural network can provide outputs that include a predicted output image.

In one example, (a copy of) the trained neural network can reside on a mobile computing device. The mobile computing device can include a camera that can capture an input image of an object, such as an image of a person's face. A user of the mobile computing device can view the input image and determine that the input image should be relit. In response, the trained neural network can generate a predicted output image that shows the input image relit based on techniques described herein, and subsequently output the output image (e.g., provide the output image for display by the mobile computing device). In another example, the user of the mobile computing device can view the input image and determine that the input image should be composited into a different target background. In response, the trained neural network can generate a predicted output image that shows the input image relit and composited into the target background.

In other examples, the trained neural network is not resident on the mobile computing device; rather, the mobile computing device provides the input image to a remotely-located trained neural network (e.g., via the Internet or another data network). The remotely-located convolutional neural network can process the input image and provide an output image that shows the relit foreground of the input image, and/or the relit foreground composited into a target background, to the mobile computing device. In other examples, non-mobile computing devices can also use the trained neural network to relight images, and composite a relit foreground into various target backgrounds, including images that are not captured by a camera of the computing device.

In some examples, the trained neural network can work in conjunction with other neural networks (or other software) and/or be trained to recognize whether an input image of an object is poorly lit, or if a foreground lighting can be enhanced based on the background. Then, the herein-described trained neural network could apply a corrective model to the foreground of the input image, thereby enhancing the lighting of the input image.

In some examples, the trained neural network can take as inputs one input image and provide one or more resulting output images. Then, the trained neural network can determine the one or more resulting output images by applying each of a plurality of target backgrounds to the input image. The plurality of output images could be provided as still images and/or as video imagery. Other effects could be generated by having the trained neural network apply a target background to a plurality of input images with different initial backgrounds. For example, two or more images comprising different subjects in different initial backgrounds can be composited into a single image with a desired target background.

As such, the herein-described techniques can improve images by applying more desirable and/or selectable lighting enhancements to images, thereby enhancing their actual and/or perceived quality. Enhancing the actual and/or perceived quality of images, including portrait images of people, can provide emotional benefits to those who believe their pictures look better. These techniques are flexible, and so can apply a wide variety of lighting representations or target backgrounds to images of human faces and other objects, particularly other objects with similar lighting characteristics.

Techniques for Foreground Relighting Using Neural Networks

FIG. 1 illustrates images 100 with an overview of the relighting framework, in accordance with example embodiments. Images 100 include image 110 depicting an input RGB image comprising a subject in an initial background. Image 120 in an alpha matte of a portion of image 110. Image 130 is a portion of an extracted foreground of image 110. Image 140 is an albedo of a portion of image 110, and image 150 depicts surface normal representation of image 110. Images 160 and 170 depict relit foregrounds of input image 110 composited into a number of different target backgrounds, where the relighting is based on a per-pixel light representation indicative of a surface geometry of the foreground (e.g., as illustrated in image 150).

Relighting Network

A relighting network can be designed to computationally generate relit images for consumer photography or other applications. As described herein, these methods are applicable to arbitrary omnidirectional input and target lighting environments. Also, for example, in addition to delivering realistic results for low-frequency lighting, the relighting network is also able to render hard shadows and specular highlights appropriate for lighting with high-frequency detail. In some embodiments, the method involves relighting, via a neural network, a foreground of the image to maintain a consistent lighting of the foreground with a target illumination.

Figure 2:
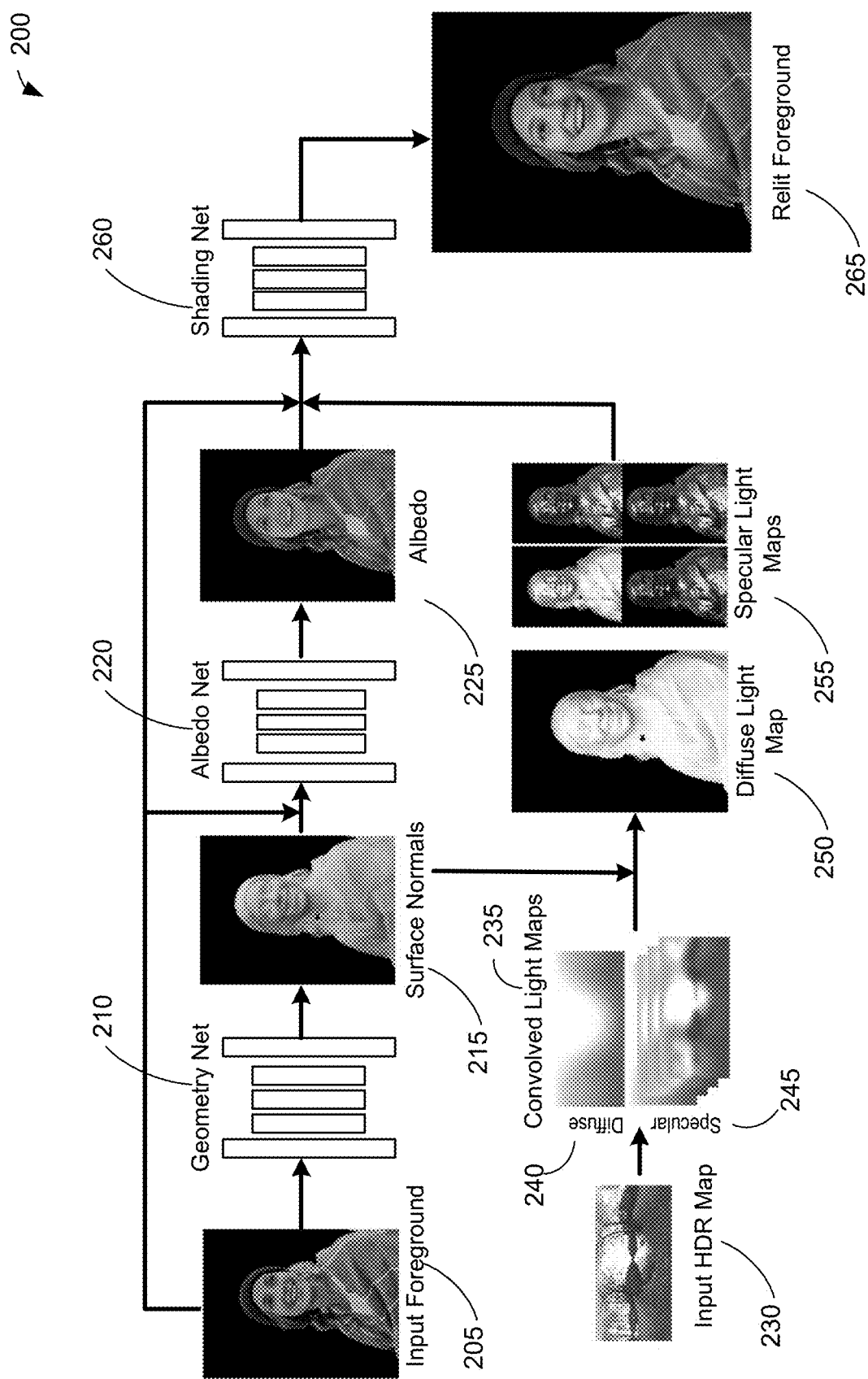
FIG. 2 is a diagram depicting a relighting network for enhancing lighting of images, in accordance with example embodiments.

FIG. 2 is a diagram depicting a relighting network 200 for enhancing lighting of images, in accordance with example embodiments. For example, relighting network 200 regresses from an input foreground F to a geometry image N, encoding per-pixel surface normal representation and then to an approximate diffuse albedo image A. An input foreground 205 may be utilized by a convolutional neural network, such as geometry net 210, to generate surface normal representation 215 indicative of a surface geometry of input foreground 205. Surface normal representation 215 may be utilized by the convolutional neural network, such as albedo net 220, to generate an approximate diffuse albedo image 225. Relighting network 200 calculates a per-pixel lighting representation or light maps L, which encode the specular S and diffuse D components of surface reflection for a given omnidirectional target HDR lighting environment and inferred surface geometry. In some embodiments, the method involves predicting, via the neural network, an output image comprising the subject in the relit foreground. For example, neural shading net 260 performs the final foreground rendering to generate relit foreground 265.

The input to relighting network 200 is a foreground F. In some embodiments, input foreground image 205 may be generated by a matting network (described with reference to FIG. 3), and resized to an inference size of 1024×768. Some embodiments involve predicting, via the neural network, a plurality of per-pixel surface normal representation. For example, geometry net 210 infers the geometry image N, represented as per-pixel surface normals 215. Some embodiments involve predicting, via the neural network and based on the foreground and the surface geometry, a per-pixel albedo image. For example, albedo net 220 infers the per-pixel albedo image A 225. Generally, surface normals 215 is a representation of surface normal vectors stored as an RGB image where the RGB components correspond to the x, y, z coordinates, respectively, of the normal vector. Although a single architecture with multiple branches may be capable of predicting per-pixel surface normals 215 and albedo 225 at the same time, surface normals 215 are easier for relighting network 200 to learn with high-quality ground truth supervision (as described herein). Accordingly, geometry net 210 is used to perform image-to-image translation of the input RGB foreground 205 to an image of surface normals 215 using an U-Net architecture.

In some embodiments, geometry net 210 may be configured to have an architecture with 13 encoder-decoder layers and skip connections. Each layer may be run through 3×3 convolutions followed by Leaky ReLU activations. The number of filters may be 32, 64, 128, 256, 512, 512 for the encoder, 512 for the bottleneck, and 512, 512, 256, 128, 64, 32 for the decoder, respectively. The encoder may utilize blur-pooling layers for down-sampling, whereas the decoder may utilize bilinear resizing followed by a 3×3 convolution for up-sampling. The output of geometry net 210 may be a surface normal image N 215, such as, for example, in camera space coordinates.

In some embodiments, surface normals N 215 and input foreground F 205 may be concatenated to form a 1024×768×6 tensor and passed as input to another U-Net, such as albedo net 220. In some embodiments, albedo net 220 may have the same architecture as geometry net 210. The output of albedo net 220 is an image of the diffuse albedo A 225 of the subject in input foreground 205. The term, "albedo," as used herein, may generally refer to a representation of a proportion of an incident light that is diffusely reflected by a surface, without being absorbed by the surface. For example, an object that is perceived as of a lighter color reflects a larger proportion of the incident light and therefore has a higher albedo. Likewise, an object that is perceived as of a darker color reflects a smaller proportion of the incident light and therefore has a lower albedo.

Some embodiments involve predicting, via the neural network, a reflectance field indicative of an appearance of the subject. For example, a target HDR illumination may be generated in a pixel-aligned format suitable for concatenation along channels, for input to a U-Net based shading network, shading net 260. Some embodiments involve pre-filtering the target illumination. The pre-filtering may be based on a convolved specular light map and a convolved diffuse light map. The specular component and the diffuse component of the surface reflection may be determined by sampling the convolved specular light map and the convolved diffuse light map by using one or more of a surface normal or a reflection vector. For example, a target HDR lighting environment, such as input HDR map 230, may be pre-filtered using convolved light maps 235, including diffuse convolved light map 240 and one or more specular convolved light maps 245. Generally, an object may have different light reflection characteristics that may depend, for example, on a surface geometry, color, and/or a material of the object. Also, for example, a surface of an object may be composed of a plurality of materials, thereby creating complex light reflection characteristics. The term "diffuse map" as used herein generally refers to an image of an object that is representative of its diffuse reflection. Diffuse reflection is a type of surface reflectance where incident light is reflected and scattered into a plurality of directions (e.g., reflection by a rough surface). The diffuse map may be indexed by a set of color values that are indicative of a texture (e.g., color and pattern) of the object. The term "specular map" as used herein generally refers to an image of an object that is representative of its specular reflection. Specular reflection is a type of surface reflectance where incident light is reflected into a unidirectional reflected light (e.g. reflection by a smooth, and/or shiny surface). The specular map represents a shininess characteristic of a surface and its highlight color.

The prefiltered diffuse convolved light map 240 and one or more specular convolved light maps 245 may be sampled using surface normals 215 or reflection vectors, producing a per-pixel representation of diffuse and specular reflectance for the target illumination, represented as diffuse light map 250 and one or more specular light maps 255. In some instances, given an input geometry, and a desire to produce a subject's appearance under a target HDR lighting environment while assuming a distant lighting model, a potential implementation may involve treating each lighting pixel as a unique light source, and then integrating a shading contribution of each light source for each pixel in surface normal image N 215, given its surface normal and a presumed bidirectional reflectance distribution function (BRDF). However, this approach may be computationally prohibitive, especially when performed at training time for millions of images. In a similarly compute-constrained setting, real-time graphics techniques have demonstrated that prefiltering or preconvolving an HDR lighting environment by cosine lobe functions representing Lambertian or Phong specular BRDFs allows the integration of the shading contribution of each light source for each pixel to be performed offline. Accordingly, diffuse light map 250 and one or more specular light maps 255 may be rendered in real-time.

For example, after precomputing a diffuse irradiance map, such as, for example, diffuse convolved light map 240, and a plurality of prefiltered HDR environment maps with different Phong exponents (e.g., n=1, 16, 32, 64), such as, for example, the one or more specular light maps 245, at training or inference time, diffuse and specular reflectance images or light maps, such as, for example, diffuse light map 250 and one or more specular light maps 255, can be computed by indexing into the prefiltered maps, diffuse convolved light map 240 and one or more specular light maps 245, using the normal or reflection vectors, such as surface normals 215.

Figure 3:
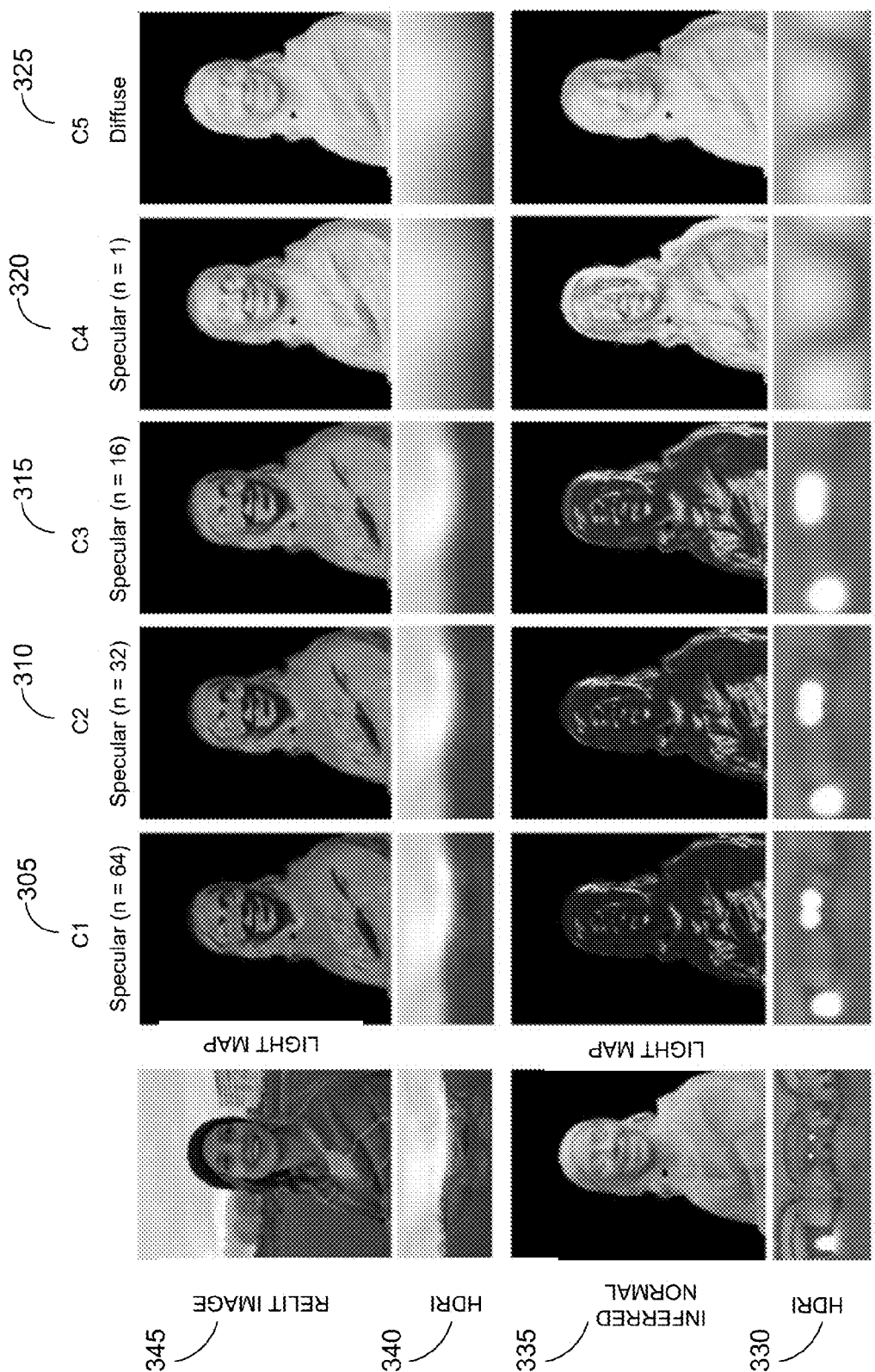
FIG. 3 illustrates example light representations, in accordance with example embodiments.

FIG. 3 illustrates example light representations, in accordance with example embodiments. For example, based on HDR input, HDRI 330, a corresponding inferred surface normal 335 may be generated. Also, for example, for HDRI 330 and HDRI 340, one or more specular light maps may be generated for different values of a Phong exponent. For example, one or more specular light maps corresponding to Phong exponents for n=64, 32, 16, 1 are shown in columns C1 305, C2 310, C3 315, and C4 320, respectively. As another example, for HDRI 330 and HDRI 340, a diffuse light map may be generated, as shown in column C5 325. Relit image 345 can be generated based on these light representations.

Referring again to FIG. 2, as is described herein, ablation studies demonstrate that relighting network 200 trained with such a lighting representation outperforms networks trained using prior representations. The approach described herein provides some control over the final relit appearance relit foreground 265, since diffuse light map 250 and one or more specular light maps 255 provided to shading net 260 may be amenable to artificial manipulation. For example, diffuse light map 250 and one or more specular light maps 255 may be suitably modified to make a skin appear shinier or more matte.

In some aspects, shading network 260 takes as input albedo 225, diffuse light map 250 and one or more specular light maps 255 to predict relit foreground 265. Some embodiments involve receiving, as input to the neural network, a plurality of candidate light maps, an albedo, and an initial foreground. Such embodiments may also involve predicting, via the neural network, the specular component of the per-pixel lighting representation. In such embodiments, the relighting of the foreground may further involve concatenating the specular component, the diffuse component, and the albedo. Such embodiments may also involve predicting, via the neural network, the relighting of the foreground based on the concatenating.

Figure 4:
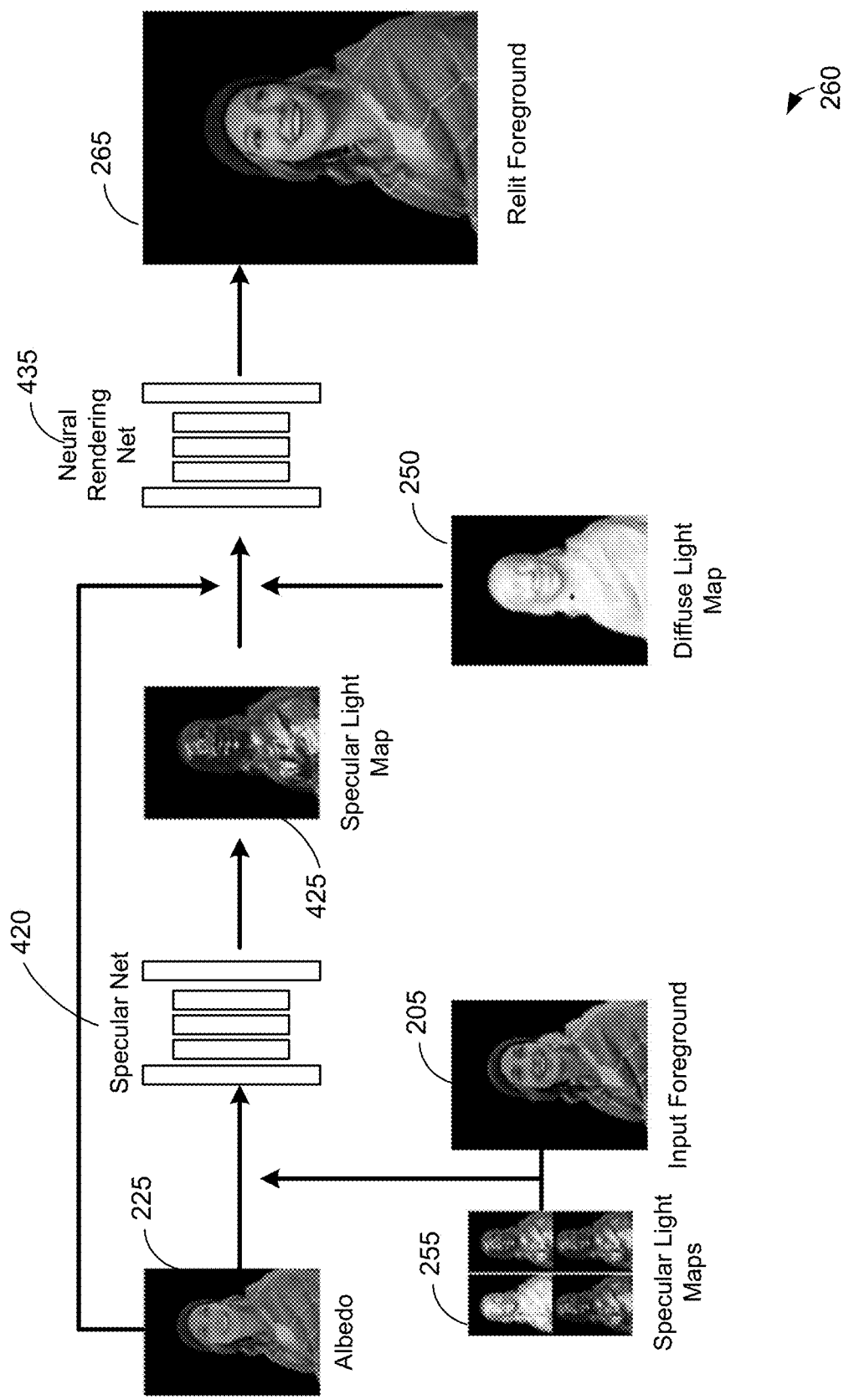
FIG. 4 is a diagram depicting a shading network to predict a relit foreground, in accordance with example embodiments.

FIG. 4 is a diagram depicting shading network 260 to predict relit foreground 265, in accordance with example embodiments. In some embodiments, shading net 260 includes two sequential networks, specular net 420 and neural rendering net 435. As described herein, a surface of an object may be composed of one or more materials. Specular net 420 models an uncertainty in the material properties of the one or more materials of an input image. One or more specular light maps 255 represented as Sn, input foreground 205 represented as F, and predicted albedo 225 represented as A, may be input into specular net 420. In some aspects, one or more specular light maps 255 may be generated with a plurality of Phong exponents n. In some embodiments, specular net 420 may be configured as an U-Net architecture. For example, specular net 420 may be configured to have an architecture with 13 encoder-decoder layers with 8, 16, 32, 64,128, 256, filters for the encoder, 256 for the bottleneck, and 256, 128, 64, 32, 16, 8 filters for the decoder, respectively. Specular net 420 may be run through 3×3 convolutions followed by Leaky ReLU activations. The output of specular net 420 may be a four channel per-pixel weight image w. A single specular light map 425 represented as Ŝ, may be obtained by taking a weighted sum of candidate one or more specular light maps 255 represented as Sn and using a per-pixel weight image w. For example, for a pixel represented with pixel coordinates (u, v), specular light map 425 may be determined as:

$$\hat{S}(u, v) = \sum_{n} w_n(u, v) \, S_n \, (u, v) \qquad \text{(Eqn. 1)}$$

where the summation is over the plurality of Phong exponents n. Albedo 225, diffuse light map 250 and blended specular light map 425 may be input into neural rendering net 435 to perform image synthesis and generate relit foreground 265. In some aspects, neural rendering net 435 may share the same architecture as specular net 420, and/or geometry net 210 of FIG. 2. Neural rendering net 435 may generally compensate for approximations employed, such as a relatively simple shading process via shading net 260, and/or any residual error in predicted intermediate images. For example, neural rendering net 435 may perform a product of albedo 225 and diffuse light map 250 to generate an image that approximates diffuse reflectance without shadowing. Images can be shaded using a Phong model, but the renderings are generally not realistic. However, blended specular light map 425 may be used to provide clues about likely location of strong highlights based on an inferred geometry. Accordingly, neural rendering net 435 may perform an addition of the approximated diffuse reflectance and blended specular light map 425 to perform shading of the surface geometry to generate a shaded image. For example, neural rendering net 435 may synthesize high frequency details, including cast shadows and non-Lambertian effects, to generate relit foreground 265.

Figure 5:
FIG. 5 illustrates aspects of shading, in accordance with example embodiments.

FIG. 5 illustrates aspects of shading, in accordance with example embodiments. For example, normals 525 may be predicted from input foreground 505 (e.g., via geometry net 210 of FIG. 2). Albedo 510 may be predicted from input foreground 505 (e.g., via albedo net 220 of FIG. 2). For a target HDR lighting environment (e.g., input HDR map 230 of FIG. 2), diffuse light map 515 and specular light map 530 may be generated (e.g., via specular net 420 of FIG. 4). As illustrated in this FIG. 5, specular light map 530 may be generated using a Phong exponent n=16. Additional and/or other exponent values may be used. Predicted albedo 510 and diffuse light map 515 may be multiplied together (e.g., via neural rendering net 435 of FIG. 4) to generate an approximate diffuse reflectance 520, without self-shadowing. Specular light map 530 may provide locations of specular reflections for a new target lighting, based on the target HDR lighting environment. A shaded image 535 may be generated (e.g., via neural rendering net 435 of FIG. 4). Also, for example, neural rendering net 435 of FIG. 4 may learn to recover self-shadowing and specularities to generate neural relighting output 540. As illustrated, the additional self-shadowing and specularities generate neural relighting output 540 that includes details beyond an output of simple shading, such as, for example, diffuse reflectance 520, and/or Phong shaded image 535.

Some embodiments involve estimating, via the neural network, the foreground of the image. In such embodiments, the estimating of the foreground may involve estimating an alpha matte.

Figure 6:
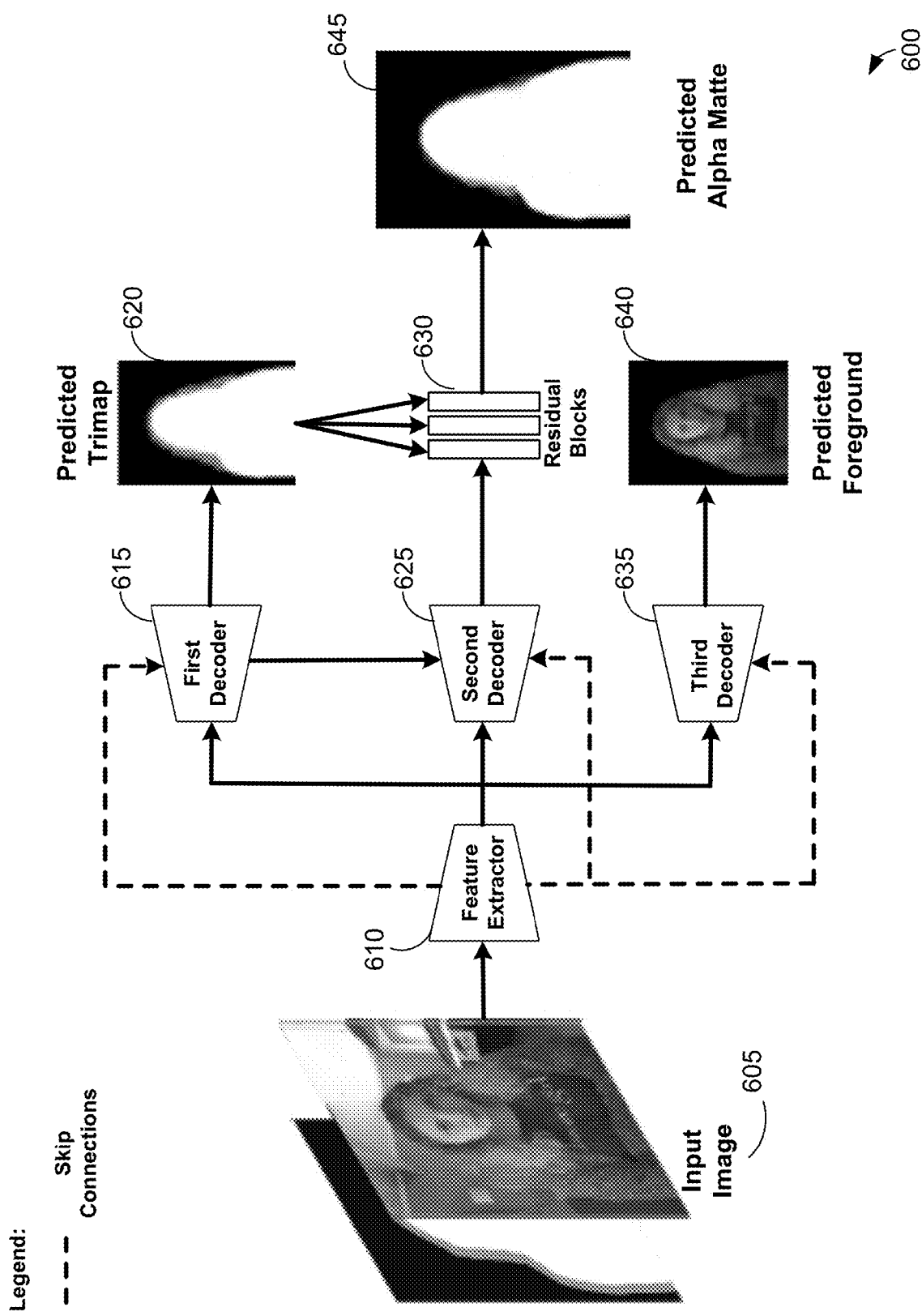
FIG. 6 illustrates an example matting and foreground estimation network, in accordance with example embodiments.

FIG. 6 illustrates an example matting and foreground estimation network 600, in accordance with example embodiments. For example, matting and foreground estimation network 600 can be configured to predict a refined trimap 620, an alpha matte 645, and a foreground 640. For an input RGB image 605, an alpha matte 645 and foreground 640 can be predicted. The estimated foreground 640 and a target HDR lighting environment are then provided to a relighting module (e.g., relighting network 200 of FIG. 2), which infers surface geometry and albedo and uses a per-pixel lighting representation to explicitly model the diffuse and specular reflection components of rendered appearance, as described with reference to FIGS. 2-5.

Alpha matting estimation refers to a process of extracting an alpha matte, and depending on the scenario, colors of foreground and background objects in an image. Each pixel C of an input image may be represented as a linear combination of a foreground pixel color F and a background pixel color B, as follows:

$$C = \alpha * F + (1 - \alpha) * B \qquad \text{(Eqn. 2)}$$

For input image 605, simultaneously solving for F, B, α is under-constrained. Generally, for RGB images, there are seven unknown variables, the RGB values for F, B, and the coefficient α, and three equations, one for each color channel of input image 605. Accordingly, additional constraints may be leveraged in classical matting estimation methods such as color sampling, using a known background color, and/or utilizing a trimap.

Accordingly, matting and foreground estimation network 600 can take input image 605 and a course trimap, T, of the foreground of input image 605. A multi-task encoder-decoder U-net architecture can be used to predict a refined trimap T̂ 620, the alpha matte α 645, and foreground F 640. Simultaneous estimation of these parameters can be performed with supervision and appropriate ground truth data.

An initial coarse segmentation can be computed using a foreground segmentation network (e.g., an off-the-shelf foreground segmentation network) trained to segment a subject (e.g., an individual) in images. Then, input trimap T is generated by thresholding the foreground probabilities from the segmentation mask and applying erode and dilate morphological operations to define the unknown region.

A feature extractor 610 takes as input the RGB image C 605, and the trimap T, and performs a series of convolutions with kernel size 3×3 with ReLU activations and 32, 64, 128, 256, 512 channels for each level respectively. An output of feature extractor 610 is passed through three different decoders that predict the refined trimap T̂ 620, alpha matte α 645, and foreground F 640.

First decoder 615 predicts the refined trimap T̂ 620 using convolutions with skip connections (represented using a dashed arrow) from the encoder 610. First decoder 615 consists of four layers with 256, 128, 64, 32 filters, extracted with 3×3 convolutions followed by Leaky ReLU activations.

Second decoder 625, with the same architecture as first decoder 615, predicts alpha matte α 645. Convolutions with skip connections (represented using a dashed arrow) from the encoder 610 may be utilized. An output of second decoder 625 is passed through a series of three residual blocks 630 with 7×7, 5×5, and 3×3 convolutions (with ReLU activations) together with the input RGB image 605 to perform a final refinement of alpha matte α 645. This refinement step (residual learning) by residual blocks 630 is effective in improving fine details of the final estimated alpha matte α 645.

Finally, third decoder 625 takes as input the encoded features to predict foreground F 640. In some embodiments, an architecture for third decoder 625 can match that of first decoder 615. Convolutions with skip connections (represented using a dashed arrow) from the encoder 610 may be utilized.

Figure 7:
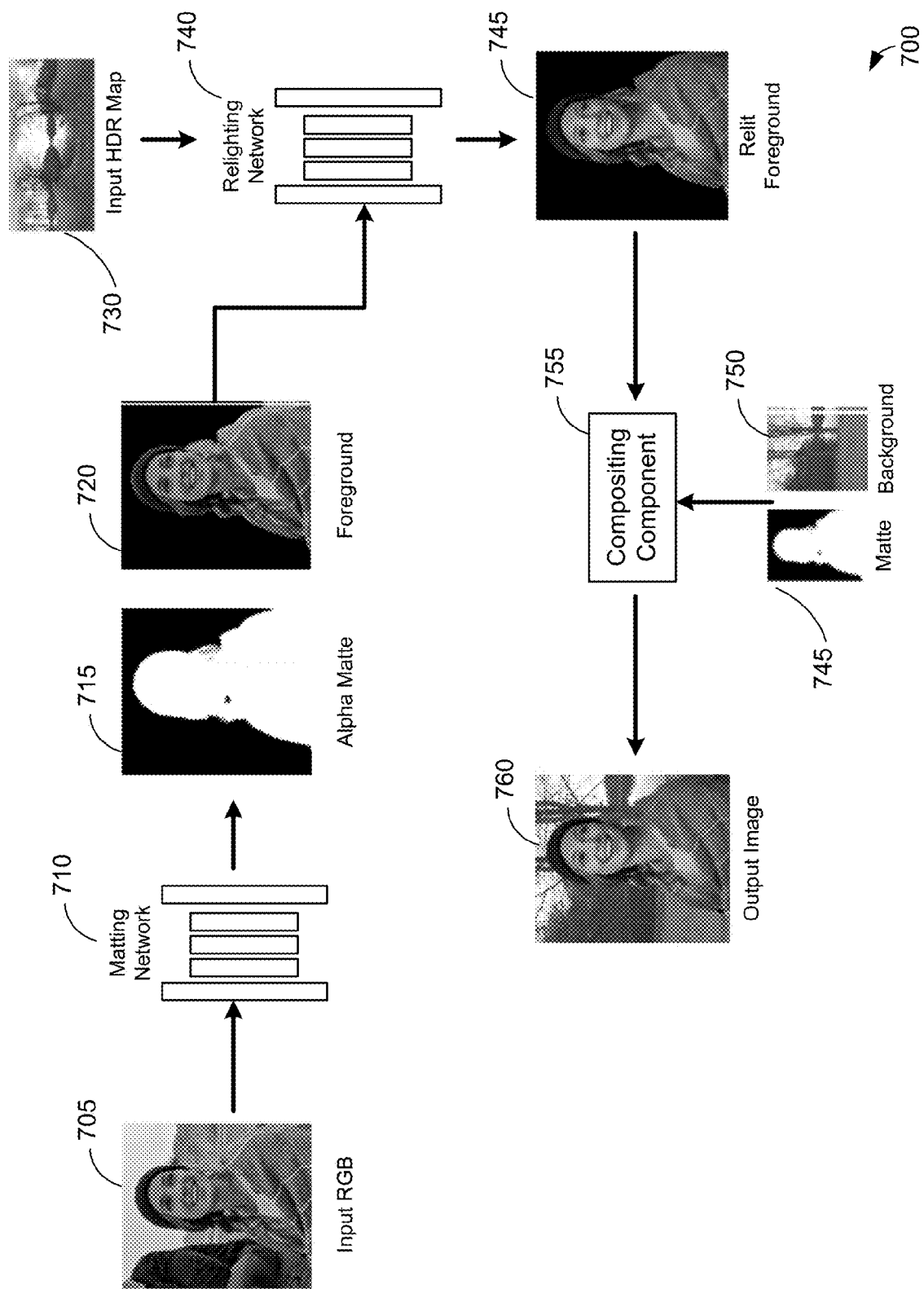
FIG. 7 illustrates an example background replacement network, in accordance with example embodiments.

FIG. 7 illustrates an example background replacement network 700, in accordance with example embodiments. Background replacement network 700 takes input RGB image 705. Input image 705 is processed by matting network 710 (e.g., matting and foreground estimation network 600 of FIG. 6) to predict alpha matte 715 and foreground 720. Input HDR map 730, corresponding to an initial background, predicted alpha matte 715, and predicted foreground 720, can be input to relighting network 740 (e.g., relighting network 200 of FIG. 2). Relit foreground 745 is output by relighting network 740. HDR lighting for a target background 750 and a matte 745, along with relit foreground 745, can be input to compositing component 755.

Compositing component 755 generates a composite of relit foreground 745 into a new background 750 extracted as an oriented view into the lighting panorama. This compositing may be performed based on the matting equation in Eqn. 2. In some embodiments, an additional deep network may be trained to learn the compositing function directly from the data, providing it with the alpha matte 715, relit foreground 745, background 750, and original RGB input image 705. For example, the additional deep network can be trained to learn to correct residual compositing errors. However, improvements from this additional deep network may be marginal, and additional compute and memory requirements may need to be balanced with a need to correct residual compositing errors. Compositing component 755 outputs image 760, where a predicted foreground 720 of input image 705 has been composited into a target background 750, while maintaining a consistent lighting of the foreground 720 with a target illumination of target background 750.

A convolutional neural network described herein (e.g., geometry net 210, albedo net 220, shading net 260, specular net 420, neural rendering net 435, matting and foreground estimation network 600, and so forth), can be a fully-convolutional neural network. During training, the convolutional neural network can receive as inputs one or more input training images. The convolutional neural network can include layers of nodes for processing an input image. Example layers can include, but are not limited to, input layers, convolutional layers, activation layers, pooling layers, and output layers. Input layers can store input data, such as pixel data of an input image and inputs from other layers of the convolutional neural network. Convolutional layers can compute an output of neurons connected to local regions in the input. In some examples, the predicted outputs can be fed back into the convolutional neural network again as input to perform iterative refinement. Activation layers can determine whether or not an output of a preceding layer is "activated" or actually provided (e.g., provided to a succeeding layer). Pooling layers can downsample the input. For example, the convolutional neural network can involve one or more pooling layers to downsample the input by a predetermined factor (e.g., a factor of two) in the horizontal and/or vertical dimensions. In some examples, some or all of the pooling layers in the convolutional neural network can downsample an input by a common factor in both horizontal and vertical dimensions, while not downsampling depth dimensions associated with the input. The depth dimensions could store data for pixel colors (red, green, blue) and/or data representing scores. Other common factors for downsampling other than two can be used as well by one or more (pooling) layers of the convolutional neural network.

Output layers can provide an output of the convolutional neural network to software and/or hardware interfacing with the conventional neural network; e.g. to hardware and/or software used to display, print, communicate and/or otherwise provide a relit image, and/or a relit image in a new background. Each layer of the convolutional neural network can include one or more input layers, output layers, convolutional layers, activation layers, pooling layers, and/or other layers described herein.

Loss Functions and Training

In some embodiments, matting and foreground estimation network 600 can be trained on one or more losses, such as, for example, a trimap loss, an alpha loss, a pyramid Laplacian loss, a foreground loss, or a compositional loss.

T trimap loss $\mathcal{L}_T$ can be determined as a sparse cross entropy loss $E(T_{gt}, \hat{T})$ between the refined trimap $\hat{T}$ and a ground truth trimap $T_{gt}$.

The alpha loss $\mathcal{L}_\alpha$ can be determined as an $\ell_1$-norm given as $\ell_1(\alpha_{gt}, \alpha)$ between a ground truth alpha matte $\alpha_{gt}$ and an inferred matte $\alpha$. In some embodiments, the alpha loss $\mathcal{L}_\alpha$ may only be computed on unknown regions of $T_{gt}$.

The pyramid Laplacian loss $\mathcal{L}_{Lap}$ is a multi-scale loss on the predicted alpha matte, and can be determined as a difference between two Laplacian pyramid representations, that may arise from local and global differences:

$$\mathcal{L}_{Lap} = \sum_{i=1}^{5} 2^{i-1} * \ell_1(Lap^i(\alpha_{gt}), Lap^i(\alpha)) \quad \text{(Eqn. 3)}$$

Contributions from deeper levels of a deep convolutional neural network may be scaled based on their respective spatial supports. Generally, the pyramid Laplacian loss improves quantitative results.

In some embodiments, a $\ell_1$ foreground loss $\mathcal{L}_F$ between a predicted foreground F and a ground truth foreground $F_{gt}$, given as $\ell_1(\Sigma F_{gt}, F)$, can be minimized. In some embodiments, the foreground loss $\mathcal{L}_F$ may only be determined for pixels for which a foreground is visible, i.e., $\alpha_{gt} > 0$.

In some embodiments, a compositional loss $\mathcal{L}_C$ may be determined based on an $\ell_1$-norm between ground truth RGB colors and a composited image using predicted foreground RGB colors, ground truth background, and the predicted alpha matte. This constrains matting and foreground estimation network 600 to follow the alpha matting equation, Eqn. 2, thereby improving predictions.

In some embodiments, matting and foreground estimation network 600 may be trained end-to-end using an overall loss based on a weighted sum of the trimap loss, the alpha loss, the pyramid Laplacian loss, the foreground loss, and the compositional loss, as follows:

$$\mathcal{L}_{overall} = \lambda_T * \mathcal{L}_T + \lambda_\alpha * \mathcal{L}_\alpha + \lambda_{Lap} * \mathcal{L}_{Lap} + \lambda_F * \mathcal{L}_F + \lambda_C * \mathcal{L}_C \quad \text{(Eqn. 4)}$$

Based on empirical determinations, in an example implementation, the hyperparameters in Eqn. 4 may be assigned values as follows: $\lambda_T = \lambda_F = \lambda_C = 1$, $\lambda_{Lap} = 4$, and $\lambda_\alpha = 2$.

In some embodiments, relighting network 200 may be trained on one or more loss functions, such as, for example, a geometry $\ell_1$ loss, an albedo VGG loss, an albedo $\ell_1$ loss, a shading VGG loss, a shading $\ell_1$ loss, a specular loss, an albedo adversarial loss, and a shading adversarial loss.

In some embodiments, a geometry $\ell_1$ loss $\mathcal{L}_{geo}$ may be determined as an $\ell_1$-norm given as $\ell_1(N_{gt}, N)$ between ground truth surface normals $N_{gt}$ and predicted normals N. The geometry $\ell_1$ loss enables relighting network 200 to learn the geometry of the subject.

In some embodiments, an albedo VGG loss $\mathcal{L}_{vgg_{alb}}$ may be determined as an $\ell_2$-norm given as $\ell_2(vgg(A_{gt}), vgg(A))$ as a squared $\ell_2$-distance between features extracted from a target albedo $A_{gt}$ and the predicted albedo A using a VGG network pre-trained on an ImageNet classification task. The albedo VGG loss $L_{vgg_{alb}}$ enables relighting network 200 to preserve sharp details of an image.

In some embodiments, an albedo $\ell_1$ loss $\mathcal{L}_{alb}$ may be determined as an $\ell_1$-norm given as $\ell_1(A_{gt}, A)$ between the ground truth albedo $A_{gt}$ and the predicted albedo A. The albedo $\ell_1$ loss $\mathcal{L}_{alb}$ enables increasing a speed of color convergence in relighting network 200.

Similar to the albedo VGG loss $L_{vgg_{alb}}$, in some embodiments, a shading VGG loss $L_{vgg_{shad}}$ may be determined as an $\ell_2$-norm given as $\ell_2(vgg(R_{gt}), vgg(R))$ as a squared $\ell_2$-distance between features extracted from a target relit image $R_{gt}$ and predicted relit images R, using a VGG network pre-trained on an ImageNet classification task.

In some embodiments, a shading $\ell_1$ loss $\mathcal{L}_{shad}$ may be determined as an $\ell_1$-norm given as $\ell_1(R_{gt}, R)$ between the ground truth relit image $R_{gt}$ and the predicted relit image R. The shading $\ell_1$ loss $\mathcal{L}_{shad}$ enables increasing a speed of color convergence in relighting network 200.

Generally, it may be challenging to explicitly supervise a separation between diffuse and specular components of reflection. Accordingly, a self-supervised training may be imposed on relighting network 200 that enables relighting network 200 to preserve specular highlights and view-dependent effects of an image. This may be achieved by determining two saliency terms $L_1 = R \odot \hat{S}$ and $L_1 = R_{gt} \odot \hat{S}$, where $\hat{S}$ is a specular component (e.g., specular light map 425 of FIG. 4), R is the predicted relit image, $R_{gt}$ is the ground truth relit image, and the operator $\odot$ indicates element-wise multiplication. In some embodiments, a specular loss $\mathcal{L}_{spec}$ may be determined as an $\ell_1$-norm given as $\ell_1(L_2, L_1)$, and $\ell_1(L_2, L_1)$ may be minimized during training of relighting network 200. The pixel-aligned lighting representation described herein allows the specular loss $\mathcal{L}_{spec}$ to be applicable to omnidirectional HDR illumination environments, instead of a single directional light.

In some embodiments, an albedo adversarial loss $\mathcal{L}_{adv_{alb}}$ may be determined based on a least squares discriminator $disc_{alb}$ to train an albedo net (e.g., albedo net 220 of FIG. 2). The albedo adversarial loss $\mathcal{L}_{adv_{alb}}$ on the face region of an image trains the network to learn to plausibly remove high-frequency shading effects from the input image while maintaining image detail. The albedo adversarial loss $\mathcal{L}_{adv_{alb}}$ may be determined as $disc_{alb}(A_{crop_{gt}}, A_{crop})$ between a crop of the face from a ground truth albedo $A_{crop_{gt}}$ and a matching crop of the face from the predicted albedo $A_{crop}$.

It is of high significance for a shading net to synthesize realistic high-frequency shading effects on the face. Accordingly, similar to the albedo adversarial loss $\mathcal{L}_{adv_{alb}}$, a shading adversarial loss $\mathcal{L}_{adv_{shad}}$ may be determined based on a least squares discriminator $disc_{shad}$ to train a shading net (e.g., shading net 260 of FIG. 2). The shading adversarial loss $\mathcal{L}_{adv_{shad}}$ may be determined as $disc_{shad}(R_{crop_{gt}}, R_{crop})$ between a crop of the face from a ground truth relit image $R_{crop_{gt}}$ and a matching crop of the face from the predicted relit image $R_{crop}$. In some embodiments, crops of saliency terms $R_{crop_{gt}} \odot \hat{S}$ and $R_{crop} \odot \hat{S}$ may be computed to act as an attention mechanism for the discriminator to focus on facial reflections.

In some embodiments, relighting network 200 may be trained end-to-end using an overall relighting loss based on a weighted sum of the geometry $\ell_1$ loss, the albedo VGG loss, the albedo $\ell_1$ loss, the shading VGG loss, the shading $\ell_1$ loss, the specular loss, the albedo adversarial loss, and the shading adversarial loss, as follows:

$$\mathcal{L}_{relighting} = \quad \text{(Eqn. 5)}$$
$$\lambda_{geo} * \mathcal{L}_{geo} + \lambda_{vgg_{alb}} * \mathcal{L}_{vgg_{alb}} + \lambda_{alb} * \mathcal{L}_{alb} + \lambda_{vgg_{shad}} * \mathcal{L}_{vgg_{shad}} +$$
$$\lambda_{shad} * \mathcal{L}_{shad} + \lambda_{spec} * \mathcal{L}_{spec} + \lambda_{adv_{alb}} * \mathcal{L}_{adv_{alb}} + \lambda_{adv_{shad}} * \mathcal{L}_{adv_{shad}}$$

Based on empirical determinations, in an example implementation, the hyperparameters in Eqn. 5 may be assigned values as follows: $\lambda_{geo} = \lambda_{vgg_{alb}} = \lambda_{vgg_{shad}} = 1$, $\lambda_{alb} = \lambda_{shad} = 0.1$, and $\lambda_{spec} = \lambda_{adv_{alb}} = \lambda_{adv_{shad}} = 2$.

In an example implementation, a training pipeline in TENSORFLOW may be used, distributing the training across 8 NVIDIA Tesla V100 GPUs with 16 GB of memory. In some training implementations, each iteration may randomly select 8 images of subjects relit with random lighting environments for both inputs and target. In some aspects, an ADAM optimizer with a learning rate of $10^{-5}$ may be utilized. Also, for example, the system may be optimized for 1M iterations for the training to converge, which may take several days (e.g., seven days). Also, for example, to increase a speed of convergence and to reduce memory usage, a matting network (e.g., matting and foreground estimation network 600) and a relighting network (e.g., relighting network 200) may be trained separately. In some embodiments, an end-to-end architecture (e.g., background replacement network 700), with both matting network (e.g., matting network 710) and relighting network (e.g., relighting network 740) may be trained on NVIDIA P6000 GPUs with 24 GB memory.

Data Acquisition and Ground Truth Generation

To train the machine learning models using supervision, several paired images of different subjects lit in various lighting environments may be used, with ground truth illumination for the target relit image. Also, estimated foreground and alpha matte components, used to generate the final composites into new scenes, are generated along with intermediate components as previously outlined, such as per-pixel albedo and surface normals. To generate this data, reflectance fields of a variety of different people recorded by multiple cameras in a light stage may be relit. The relit images may then be composited onto target backgrounds using alpha mattes derived from the light stage data using a deep learning model. This process produces more realistic training data than synthetic renderings of facial photogrammetry scans with approximated BRDF's. As a result, relighting network 200 may perform a better job of reproducing complex light transport phenomena such as sub-surface scattering and spatially-varying specular reflections on skin and hair.

Reflectance Field Acquisition

In some implementations, to photograph a subject's reflectance field, a computer-controllable sphere of white LED light sources can be used with lights spaced 12° apart at the equator. In such implementations, the reflectance field is formed from a set of reflectance basis images, photographing the subject as each of the directional LED light sources is individually turned on one-at-a-time within the spherical rig. Such One-Light-at-a-Time (OLAT) images are captured for multiple camera viewpoints. In some implementations, the light stage may have 331 programmable LED-based lights and 58 RGB cameras, recording video at 60 Hz with 12.4 megapixel resolution, although these values and number of OLAT images and types of cameras used may differ in some implementations.

In some implementations, reflectance fields for 70 diverse subjects may be used, each subject performing nine different facial expressions and wearing different clothing and accessories (e.g., hats, scarves, etc.), yielding about 700 sets of OLAT sequences from multiple camera viewpoints. In some implementations, approximately 10% of the OLAT sequences may be recorded with 58 cameras, covering the full 360° of possible vantage points to provide training examples from arbitrary viewpoints, covering the full body. The remaining 90% of the OLAT sequences may be recorded with a subset of six frontal viewpoints intended to emulate the framing of casual photography. In one implementation, 7,560 unique sequences may be recorded for the 58 RGB cameras, which were then relit and composited using approximately 200 HDR panoramic lighting environments using random rotations, thereby generating 8 million training examples. Other quantities of sets of OLAT sequences may be used. For evaluation purposes, the dataset may be divided into sets for training and testing. In some instances, seven subjects with diverse skin tones may be selected for the test set, along with ten lighting environments.

Figure 8:
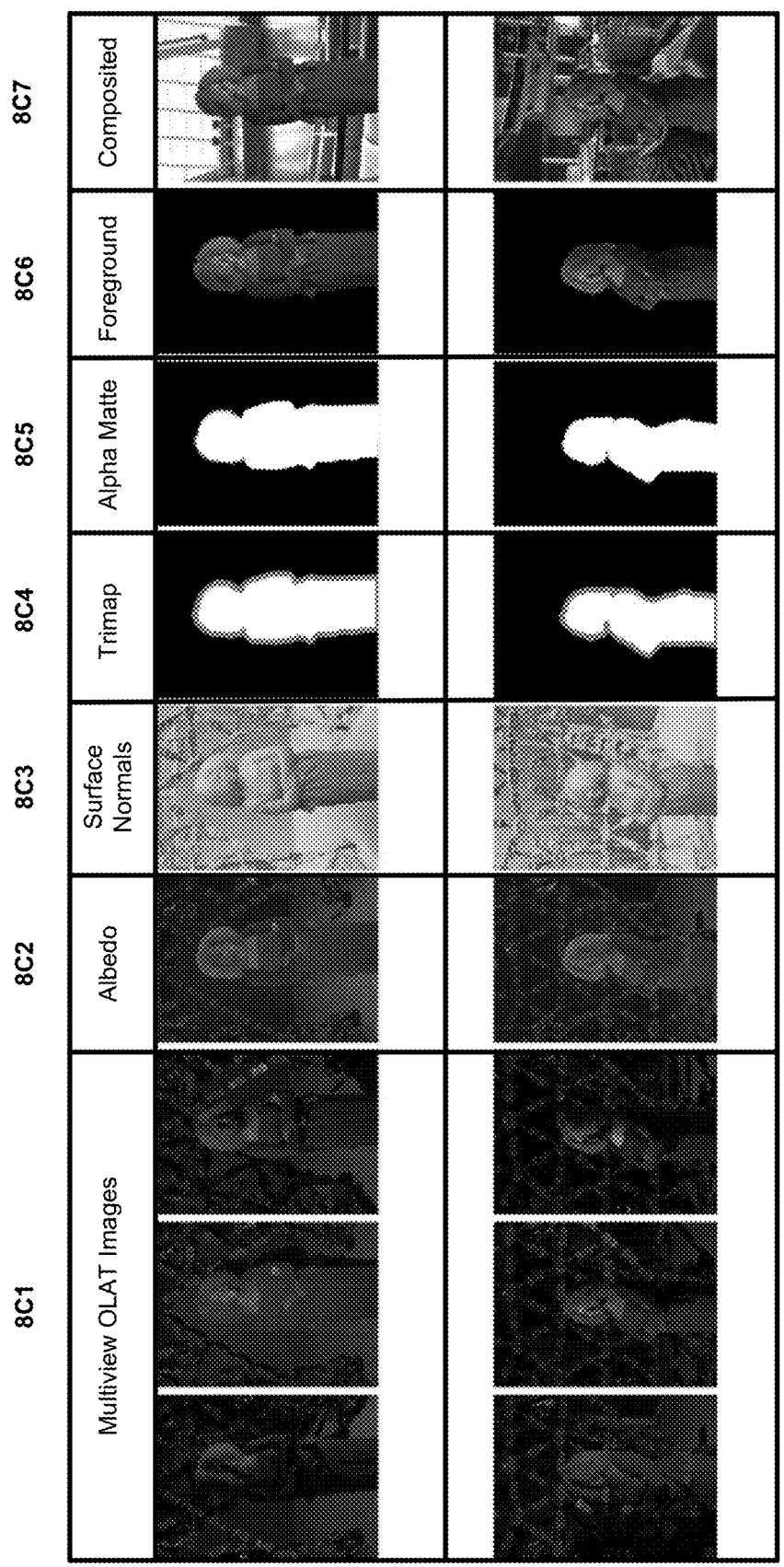
FIG. 8 illustrates example ground truth images, in accordance with example embodiments.

FIG. 8 illustrates example ground truth images 800, in accordance with example embodiments. Column 8C1 displays multi-view OLAT images used to supervise training. Column 8C2 illustrates example predicted albedo images based on the OLAT images, and column 8C3 illustrates example predicted surface normals based on the OLAT images. Column 8C4 illustrates example rough segmentation trimaps, while column 8C5 illustrates example alpha mattes predicted based on the rough segmentation trimaps. Column 8C6 illustrates predicted foreground obtained by a linear combination of the OLAT images, where the relit foreground is according to a target HDR lighting environment. Column 8C7 illustrates the relit foreground composited into a target background using the estimated alpha matte in column 8C5.

Ratio Matting Technique

Ground truth alpha mattes $\alpha_{gt}$ may be measured for two frontal camera viewpoints in the light stage by using a ratio matting technique. For example, an image of the subject silhouetted against an illuminated background (e.g., a flat grey cloth) may be recorded as one of the lighting conditions in the OLAT data. In addition, an OLAT image may be recorded in the light stage without the subject after each session, which can include a clean plate of the illuminated background. The silhouetted image, divided by the clean plate image, provides a ground truth alpha channel. The background cloth may not be illuminated while the rest of the OLAT sequence is captured, but some of the OLAT lighting may fall onto the background cloth. The clean plate OLATs indicate an amount of background spill light B there is for each lighting direction, so a and B may be used to compute the foreground color F for each OLAT image using the matting equation, Eqn. 2.

Figure 9:
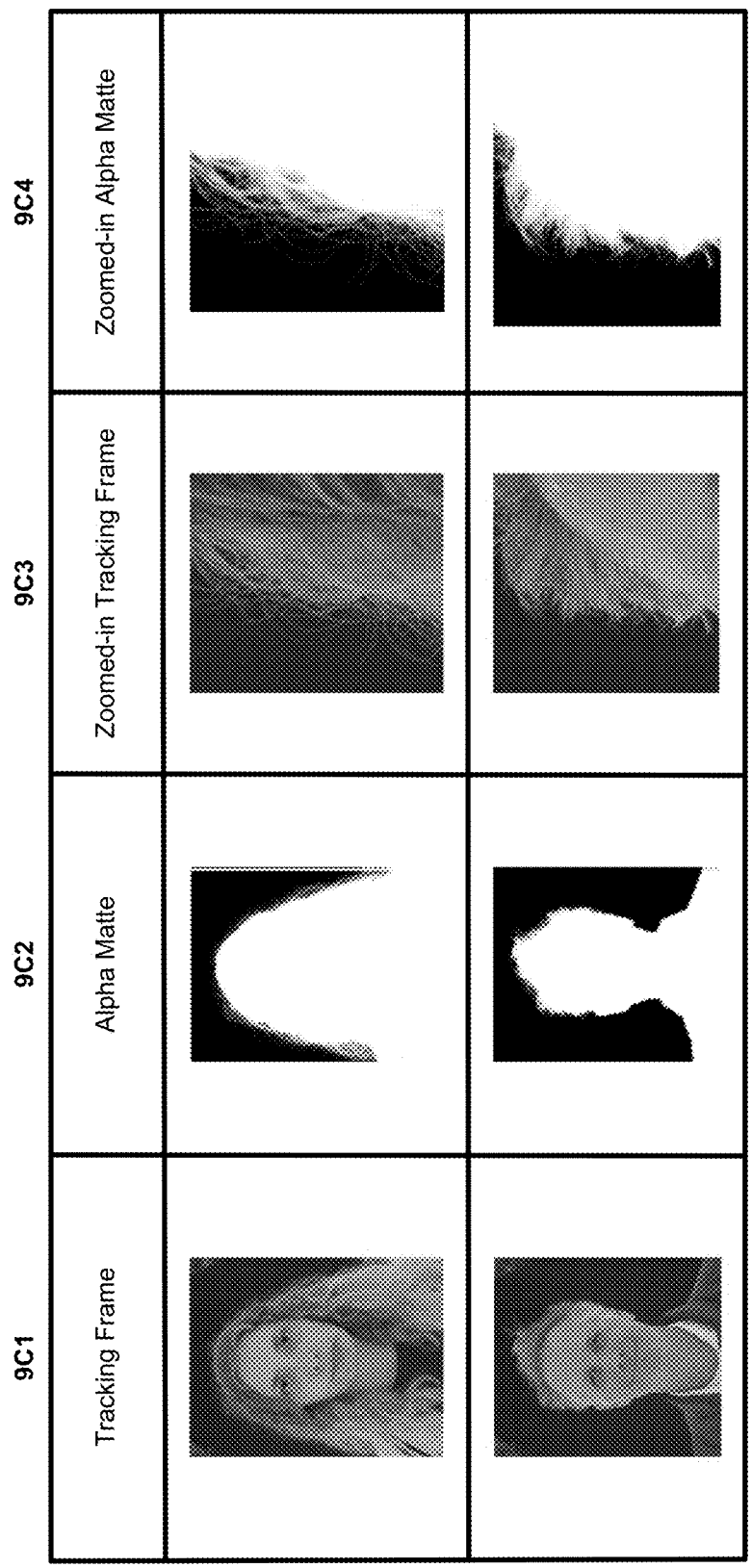
FIG. 9 illustrates example alpha mattes based on a ratio matting technique, in accordance with example embodiments.

FIG. 9 illustrates example alpha mattes 900 based on a ratio matting technique, in accordance with example embodiments. As illustrated, alpha mattes are shown with insets that show fine details in regions with hair strands. For example, column 9C1 illustrates two example tracking frames. Column 9C2 illustrates respective alpha mattes. Column 9C3 shows zoomed-in images of the tracking frames in column 9C1, where fine details in regions with hair strands are shown. Column 9C4 shows zoomed-in portions of the corresponding alpha mattes in column 9C2.

Extending Ratio Matting with Deep Learning

As described herein, two cameras in the light stage view the subject against the illuminated background (e.g., a flat grey cloth). The majority of the cameras view the subject in front of the struts and wires and cameras and light sources of the apparatus. In some embodiments, a ground truth alpha generation model may be trained.

Figure 10:
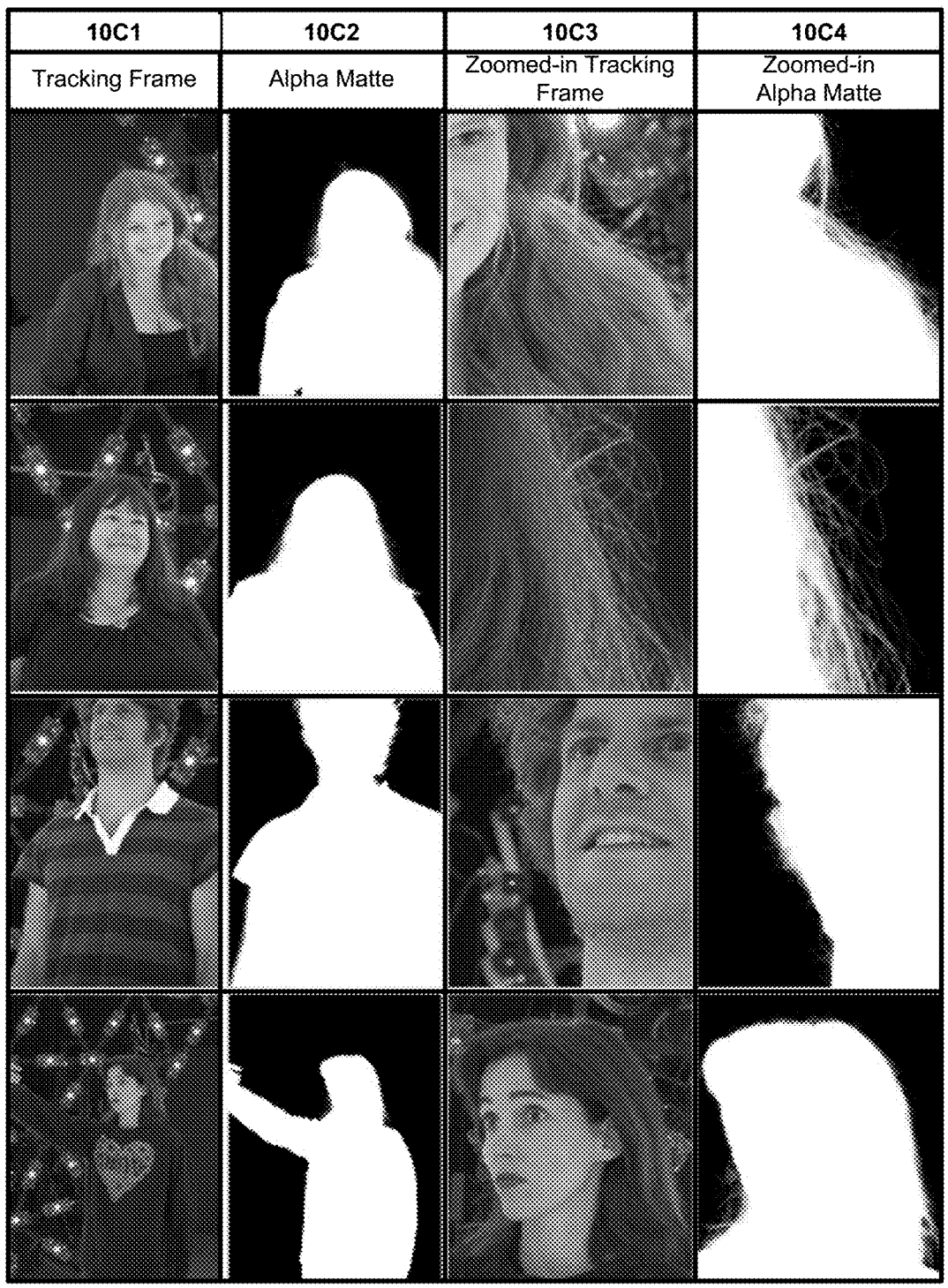
FIG. 10 illustrates example results of background matting in a light stage, in accordance with example embodiments.

FIG. 10 illustrates example results of background matting in a light stage, in accordance with example embodiments. As illustrated in column 10C1, a camera view, or tracking frame, of a different subject is shown in front of struts, wires, cameras and light sources of the light stage. To generate alpha mattes for these viewpoints, the clean plate image, described earlier, may be used for each such view shown in column 10C1. Subsequently, a deep learning based alpha matting model may be trained that takes as inputs the clean plate (e.g., the cluttered background image B), a coarse segmentation mask computed using a segmenter (e.g., an off-the-shelf segmentation model), and the input image, and infer an alpha matte, as shown in column 10C2. In some aspects, this ground truth alpha generation model is different from the in-the-wild alpha matting model (e.g., matting and foreground estimation network 600), since during the ground truth capture, the clean plate B is known and supplied as additional input to the network. Column 10C3 shows zoomed-in images of the tracking frames in column 10C1, where fine details in regions with hair strands are shown. Column 10C4 shows zoomed-in portions of the corresponding alpha mattes in column 10C2.

In some embodiments, the ground truth alpha generation model may be trained with supervision, using a dataset created with high quality alpha mattes obtained from the frontal cameras with the ratio matting technique. To simulate the cluttered backgrounds for this dataset, foregrounds obtained from the frontal camera viewpoints may be composited into the cluttered clean plate images B acquired for the other non-frontal views using the matting equation, Eqn. 2. Accordingly, a training dataset of images with ground truth a may be generated, that is representative of the light stage imagery captured for non-frontal viewpoints, where ratio matting technique may not be applicable. To make the ground truth alpha generation model robust to small misalignments between the cluttered clean plate and input images, slight spatial perturbations may be added to the backgrounds during training, and background images with slight adjustments (such as, for example, including clean plates captured across different days, where light stage cabling could subtly move in the field-of-view, and so forth) may be added as well. Also, for example, standard data augmentation techniques may be employed to improve model generalization (e.g. cropping, rotation, adjustments in exposure, adding Gaussian noise, and so forth).

Albedo and Geometry Acquisition

To generate per-pixel surface normals, an overdetermined system of linear equations may be solved at each pixel with a photometric stereo solver formulation. Using 331 OLAT images, the images may be converted to grayscale and, for a given pixel location (u, v), pixel intensities may be sorted across the images representing different lighting directions. As there are more equations than unknowns with such a large lighting basis, in some embodiments, some pixels that are likely to be noisy or in the shadow (e.g., pixels representing the lowest 50% of values), and pixels that are likely to be specular reflections (e.g., pixels representing the top 10% of values), may be not be used. This may increase the likelihood that pixel values used for photometric stereo represent unoccluded observations of the Lambertian component of the surface reflectance, as required for classical photometric stereo. Examples of per-pixel surface normal images generated using this technique are illustrated in column 8C3 of FIG. 8.

Although the photometric stereo equation also yields per-pixel estimates of diffuse albedo, in some instances, an image of the subject in flat omnidirectional lighting may be used. Such images can be readily available as the tracking frames used to align the OLAT sequences, and include the useful shading cue of ambient occlusion.

Ground Truth Compositing

By leveraging the reflectance field for each subject and the alpha matting achieved with the ground truth alpha matte generation model, each image may be relit according to a given HDR lighting environment. Relit subjects may be composited into backgrounds corresponding to the target illumination following the matting equation, Eqn. 2. The background images may be generated from the HDR panoramas by positioning a virtual camera at the center of the panorama, and ray-tracing into the panorama from the camera's center of projection with super-sampling. In some instances, the projected view into the panorama may be arranged to match its orientation as used for relighting. Also, for example, high-resolution panoramas (e.g., 16$k$ resolution) may be used to ensure sharp features are captured for the background imagery. Virtual cameras with different focal lengths can be used to simulate the different fields-of-view of consumer cameras. Several examples of composite training images made with this process are illustrated in column 8C7 of FIG. 8.

Evaluations

Performance of the relighting and background replacement framework described herein may be evaluated by comparing with other approaches. As previously described, seven subjects with diverse skin tones may be selected to be held out from training for evaluation purposes, along with ten lighting environments. To assess how well the relighting framework described herein generalizes to real world imagery, the framework may be tested on images captured in-the-wild under arbitrary illumination conditions, and based on subjects not viewed by the framework during training.

Image Relighting

Evaluation of the relighting module reveals superior performance compared with other non-deep learning based techniques. For the evaluation subjects photographed in the light stage, ground truth relighting results may be obtained, enabling both qualitative and quantitative comparisons among the proposed framework and other techniques. The relighting framework described herein generally outperforms other techniques across a diverse set of subjects, demonstrating increased photorealism. In particular, the relighting framework is able to accurately relight subjects of different skin tones.

For quantitative evaluation experiments, multiple metrics may be computed to assess the quality of image rendering. For example, a mean absolute error (MAE), defined as the $\ell_1$ distance between the predicted relit image and the ground truth relit image, a mean squared error (MSE), a structural similarity index measure (SSIM), and a perceptual loss (e.g., the Learned Perceptual Image Patch Similarity (LPIPS) metric) may be determined. To limit the comparison to relighting quality only, all errors may be computed only on the foreground and ground truth masks that are used for all the methods for a fair comparison. The relighting framework described herein outperforms other techniques on evaluated metrics for the image relighting task.

Performance for images photographed in-the-wild under arbitrary illumination conditions may be evaluated, and results indicate that the relighting framework described herein is able to relight subjects of diverse skin tones. The relighting framework is particularly effective at removing harsh specular highlights from the input image and generalizes well to in-the-wild images.

Image Compositing

For the compositing task, the relighting framework described herein substantially increases the realism of the composited images as compared with other methods. Generally, background replacement composite images formed using other techniques look unrealistic when the illumination of the target scene differs substantially from the one of the input image. By matching the target illumination condition, the relighting framework described herein is able to remove harsh lighting effects in the input imagery, and better harmonize the foreground subject with the target scene. Also, for example, the relighting framework described herein renders specularities and does not over-smoothen high-frequency image details, and is able to synthesize compelling results on a wide range of input images and target illumination conditions. Generally, evaluation results demonstrate the importance of considering relighting, matting, and compositing in a single framework in order to obtain convincing and nearly photorealistic results for the background replacement task.

Ablation Study

In some aspects, individual components of the proposed framework may be analyzed for design choices.

Light Representation

The pixel-aligned lighting representation scheme described herein may be a standalone feature that improves the relighting capability of a neural renderer (e.g., neural rendering net 435). This may be evaluated by fixing the network architecture, losses, and the training set and by employing different alternatives only for the lighting representation. In particular, the lighting representation allows for more accurately rendered specular highlights, while also preserving sharp details. Also, for example, relying solely on high-quality training data is not sufficient to obtain realistic, high quality results, and the light representation is a key component of the relighting framework.

Figure 11:
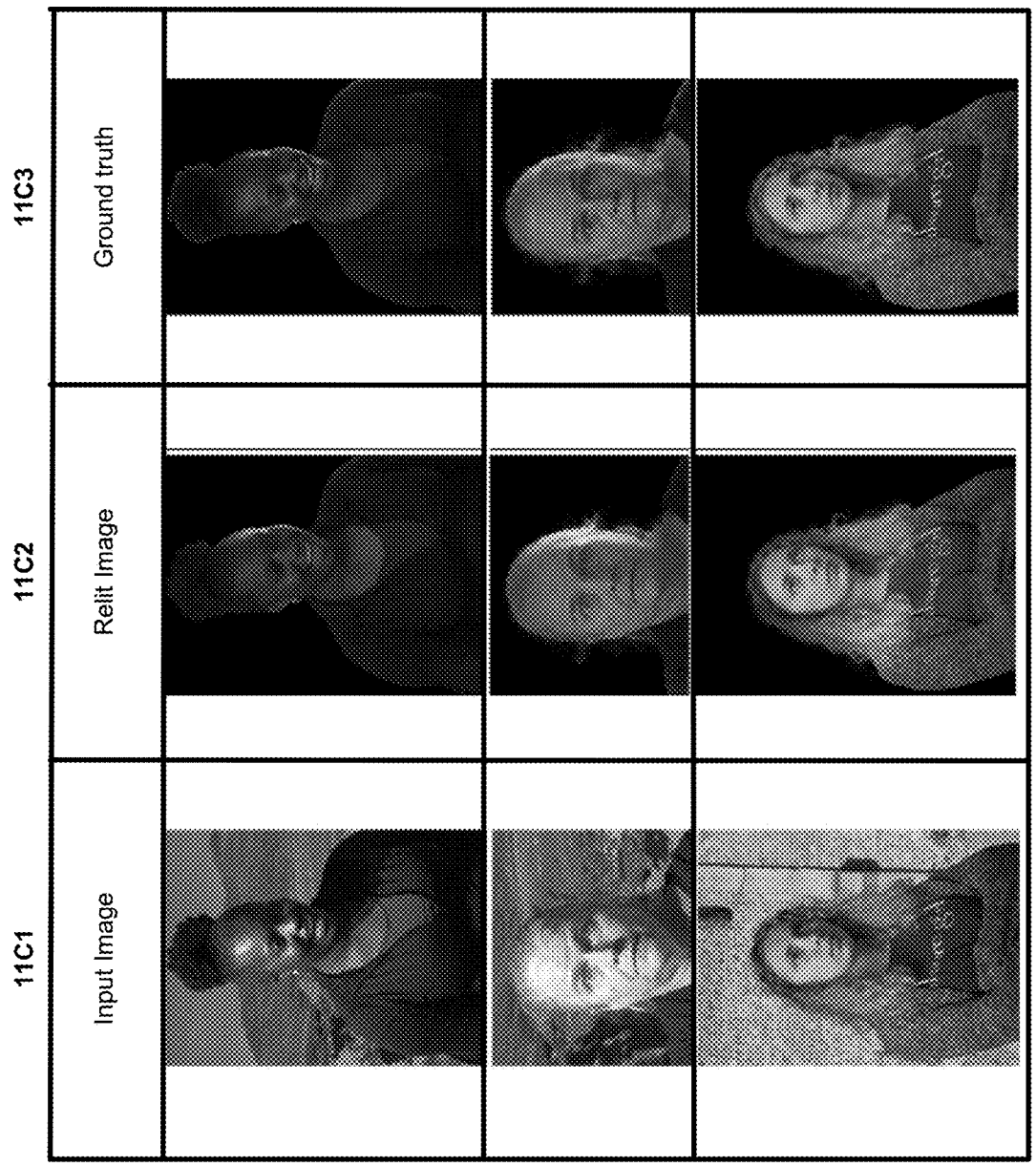
FIG. 11 illustrates example relit images based on a light representation, in accordance with example embodiments.

FIG. 11 illustrates example relit images based on a light representation, in accordance with example embodiments. Column 11C1 illustrates example input images. The corresponding relit image is shown in column 11C2. Upon comparison with the ground truth images in column 11C3, it can be seen that the relit images in column 11C2 match the ground truth images in column 11C3.

Use of Specular Light Maps

To isolate the effect of the one or more specular light maps, another model may be trained without providing the one or more specular light maps to the model. For example, a variant of a model without the specular network (e.g., specular net 420 of FIG. 4) may be trained, by providing the variant with a single specular light map S with a specular exponent n=16.

Figure 12:
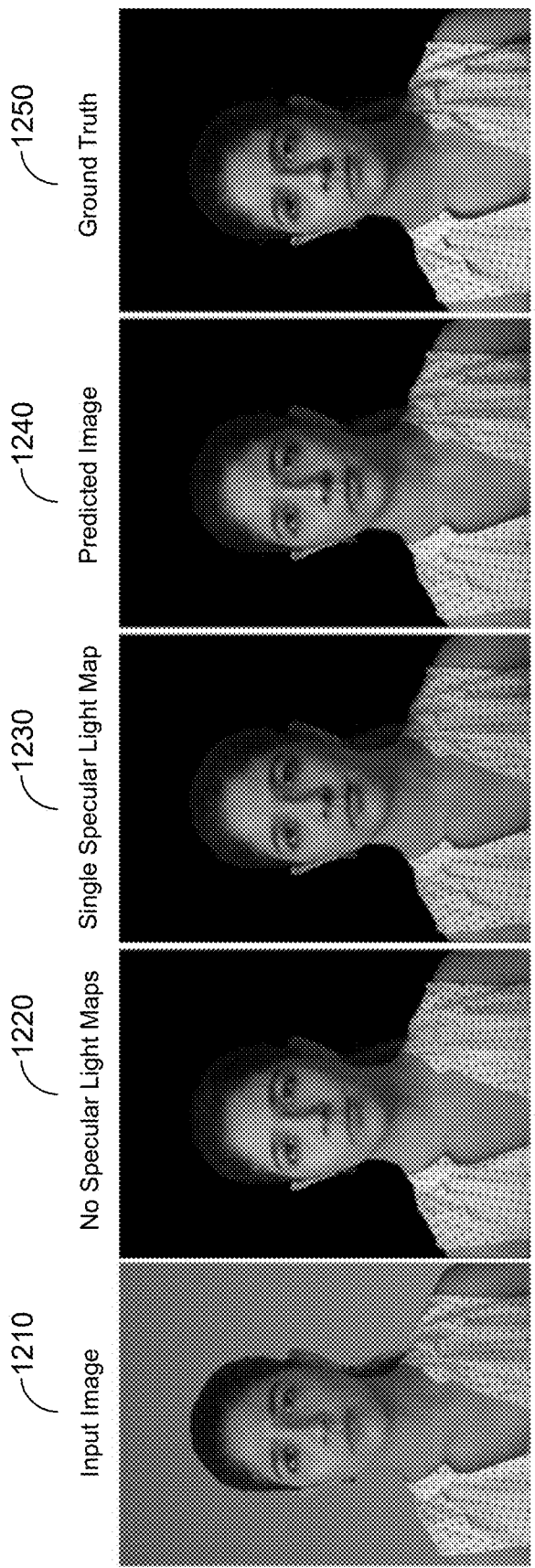
FIG. 12 illustrates examples of ablation results for specular light maps, in accordance with example embodiments.

FIG. 12 illustrates examples of ablation results for specular light maps, in accordance with example embodiments. A blended specular light map helps guide the relighting network towards generating view-dependent effects, while using a single specular light map, or without any specular lights maps, leads to overly-smooth results with missing high-frequency specularities. In this example, where the target illumination is not all that dissimilar from that of the input image, the models without the lighting representation of the relighting network cannot synthesize specularities, such as on the subject's nose. For example, when input image 1210 is relit with no specular light maps, second image 1220 is obtained. Also, for example, when input image 1210 is relit with a single specular light map, third image 1230 is obtained. Fourth image 1240 illustrates a result of utilizing the lighting representation of the relighting network. Upon comparison with the ground truth image 1250, it can be seen that the predicted relit image 1240 matches the ground truth image 1250.

Adversarial Loss

The adversarial loss on the face region allows the network to learn to generate plausible, more photorealistic facial imagery.

Figure 13:
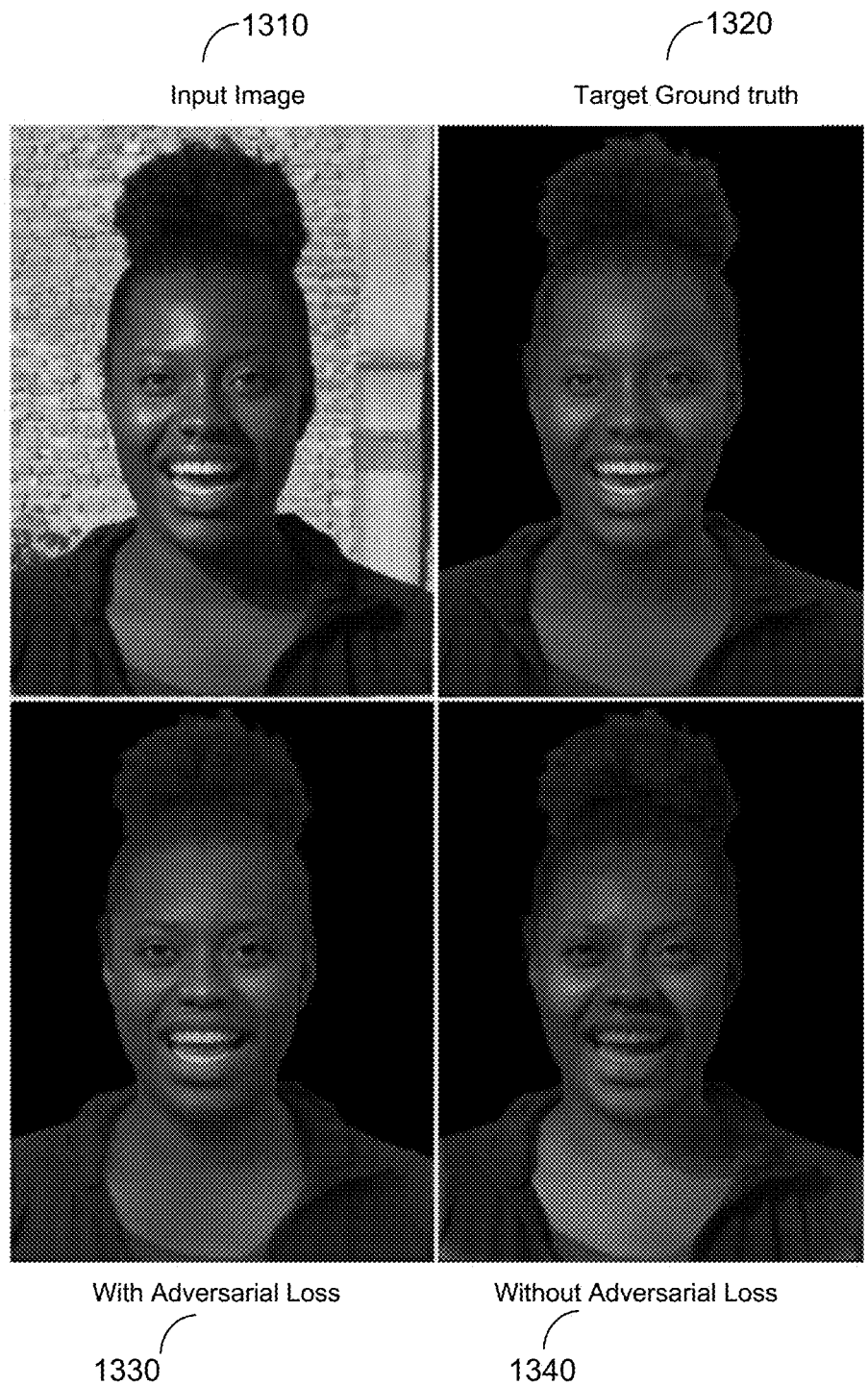
FIG. 13 illustrates examples of ablation results for adversarial loss, in accordance with example embodiments.

FIG. 13 illustrates examples of ablation results for adversarial loss, in accordance with example embodiments. For example, for an input image 1310 and a ground truth image 1320, a relighting result obtained using the relighting network trained on an adversarial loss is shown in image 1330, and a relighting result obtained using another model trained without the adversarial loss is shown in image 1340. As illustrated in image 1340, the network trained without the adversarial loss struggles to remove bright specular highlights and hard shadows in input image 1310. However, as illustrated in image 1330, the network trained with the adversarial loss, as in the relighting network described herein, the result matches the ground truth image 1320.

Relighting for Alpha Matting

In some examples, an effect of using relighting when generating the data used to train an alpha matting estimation model may be evaluated. Generally, it may be shown that a more realistic training dataset including relighting can improve alpha matting estimation. In particular, the alpha matting estimation model can be trained on the generated dataset described with reference to ground truth compositing, and the alpha matting estimation model can be compared with a network trained on the same data without relighting the subjects to match the target scenes, and instead using a "fully lit" image for the foreground.

Figure 14:
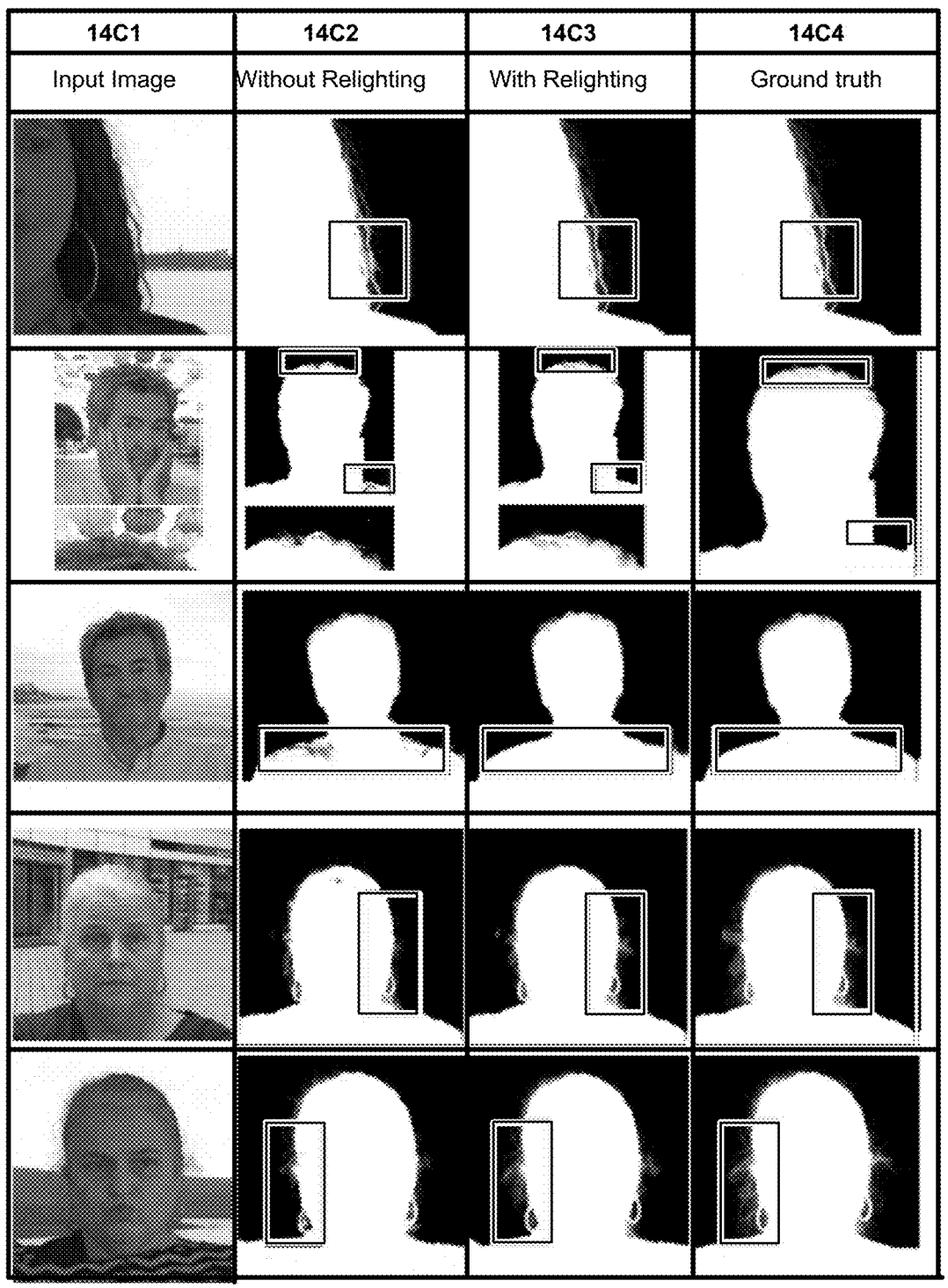
FIG. 14 illustrates examples of ablation results for the alpha matting estimation model, in accordance with example embodiments.

FIG. 14 illustrates examples of ablation results for the alpha matting estimation model, in accordance with example embodiments. To evaluate performance, a Mean Squared Error, SAD, and Gradient on the unknown pixels of the evaluation images (e.g., ground truth trimaps) can be used. The SAD and gradient losses may be scaled by a factor of 1000 due to a large resolution of the images used in the ablation study. For example, images in column 14C1 show various input images. Images in column 14C2 correspond to results of the alpha matting estimation model without relighting, and images in column 14C3 correspond to results of the alpha matting estimation model with relighting. As illustrated, images in column 14C3 correspond to results of the alpha matting estimation model with relighting match the ground truth images in column 14C4. The bounding boxes indicated in the images in columns 14C2, 14C3, and 14C4 show the comparative results for finer details in the images.

These results suggest that training a matting model using imagery with illumination harmonized to the target background improves matting model performance and generalization to arbitrary illumination conditions at test-time, especially for images with illumination substantially different from a simple, flatly-lit image.

Intermediate Outputs

Figure 15:
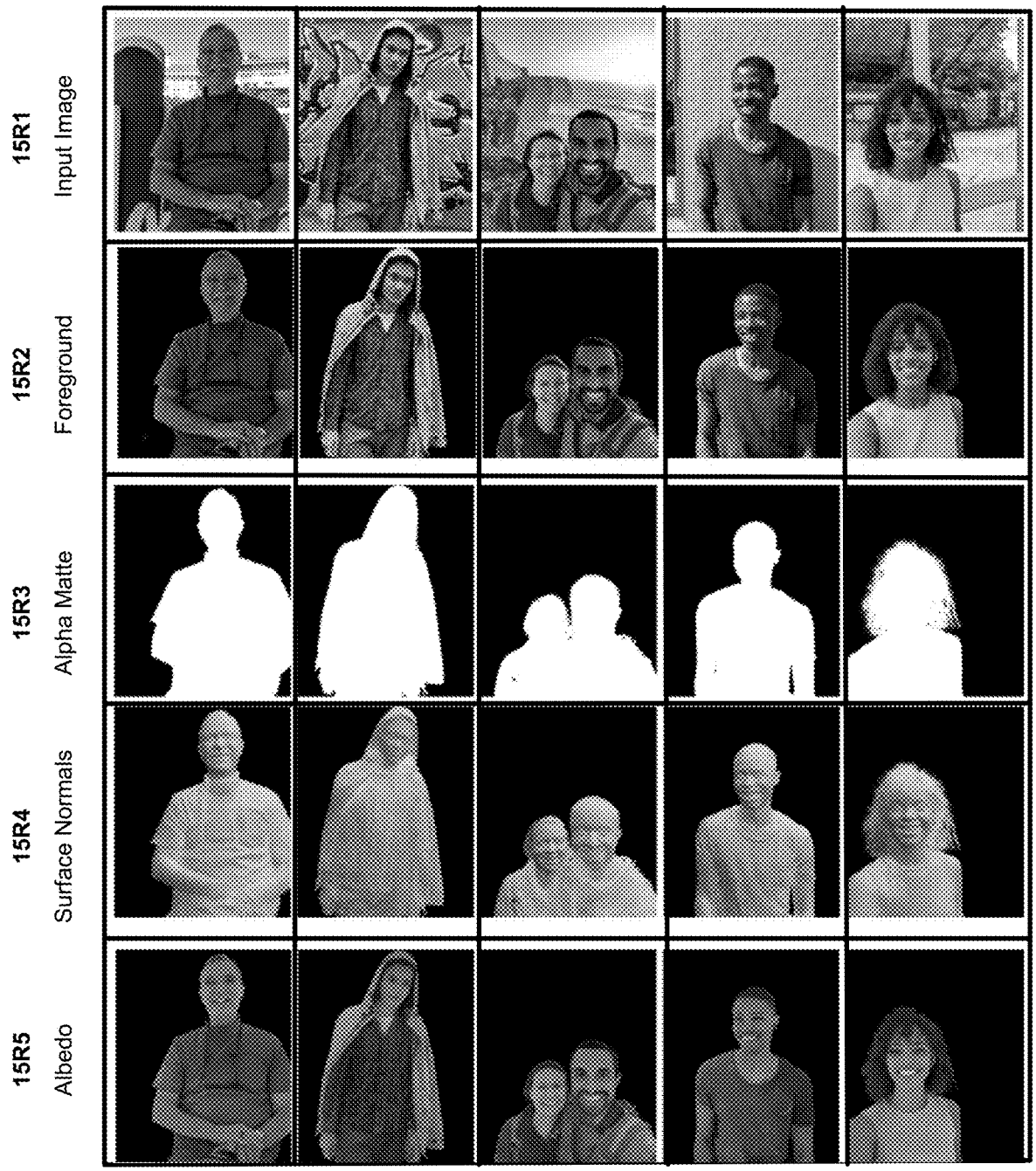
FIG. 15 illustrates example intermediate outputs, in accordance with example embodiments.

Although the convolutional neural networks described herein predict image relighting and compositing, the network predicts a plurality of intermediate outputs as shown in FIG. 15 on a diverse set of in-the-wild images. Despite the very challenging input lighting conditions, robust alpha mattes, albedo images, and surface normals may be generated.

FIG. 15 illustrates example intermediate outputs, in accordance with example embodiments. One or more intermediate outputs, such as, for example, a foreground, an alpha matte, a surface normal, and an albedo may be predicted. Row 15R1 displays a plurality of input images. Row 15R2 displays estimated foreground images corresponding to the input images in row 15R1. Row 15R3 displays respective alpha mattes. Row 15R4 displays respective predicted surface normals. Row 15R5 displays respective predicted albedo images.

Directional Light Prediction

In some embodiments, one of the evaluation subjects may be evaluated as illuminated by one or more directional light sources, generating HDR panoramic lighting environments to approximately match the positioning of the lights within the light stage. This framework may be utilized to synthesize OLAT or reflectance field basis images. Single light sources can be used to emphasize complex light transport effects such as specular highlights and subsurface scattering, which enable true photorealism. As described herein, the methods synthesize both diffuse and specular components and can be configured to learn self-shadowing directly from the data.

Applications

Computational Photography

A general application of the technique described herein is to perform background replacement for images captured in-the-wild. In some embodiments, the image of the subject may be in an initial background that is different from the target background.

Figure 16:
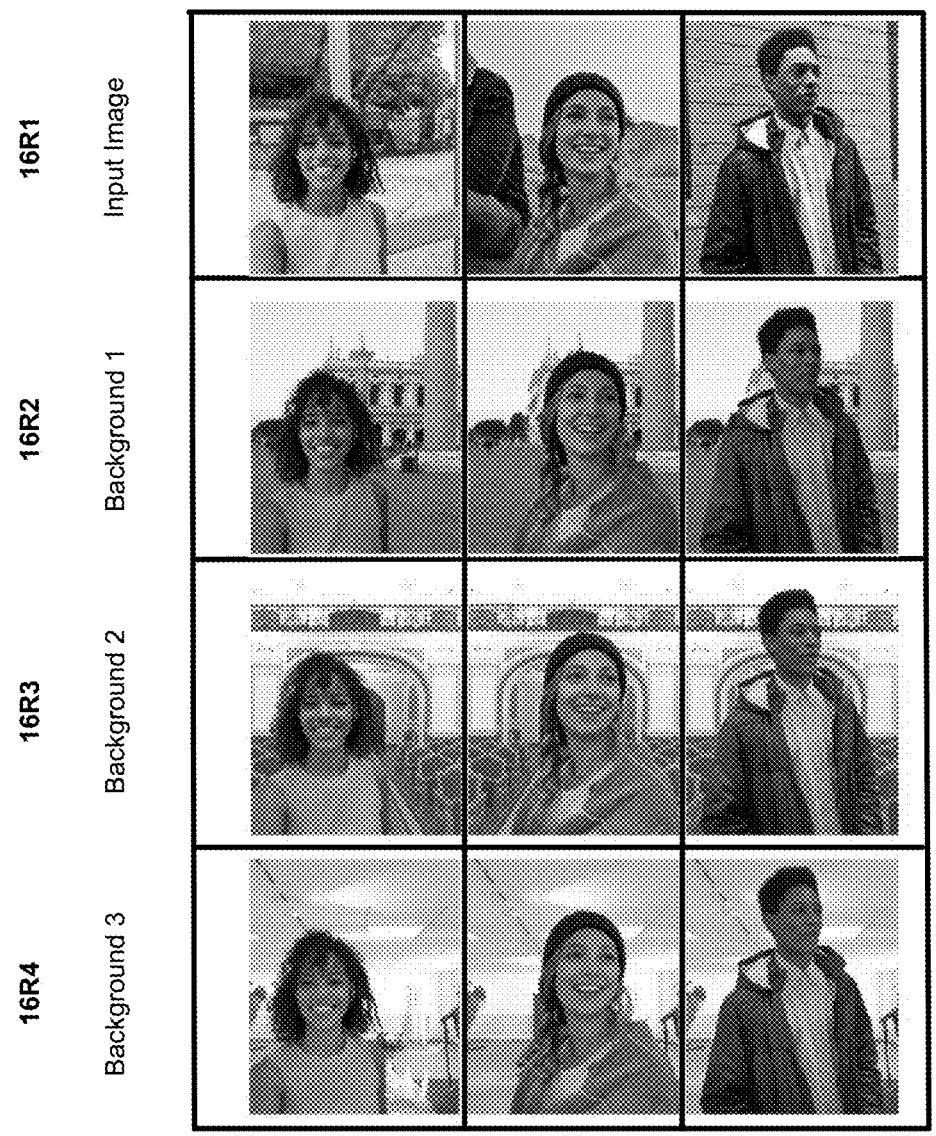
FIG. 16 illustrates example foregrounds relit in different target backgrounds, in accordance with example embodiments.

FIG. 16 illustrates example foregrounds relit in different target backgrounds, in accordance with example embodiments. For example, row 16R1 displays input images with three different subjects in respective initial backgrounds. The respective foregrounds from these images are relit and composited into different target backgrounds. Row 16R2 shows the subjects in row 16R1 composited into a first target background; row 16R3 shows the subjects in row 16R1 composited into a second target background; and row 16R4 shows the subjects in row 16R1 composited into a third target background.

As described herein, the disclosed techniques can work in dynamic lighting environments, i.e. where the lighting environment rotates around the subject, yielding consistency and stability across frames (e.g., images 170 of FIG. 1). The disclosed techniques produce realistic and plausible diffuse and specular reflections, can simulate plausible rim lighting along the edge of the face, and can reconstruct diffuse skin tones obscured by specular reflections in the source images. The network also simulates a version of the veiling glare one may expect to see in a backlit photo, since the light stage training data includes natural glare from lights in the back of the stage.

Live-Action Compositing

Although the approach is designed to operate on still images, the disclosed technique may be applied to background replacement tasks in videos. Despite the per-frame computation, with no explicitly-modeled temporal consistency, the disclosed technique produces overall accurate compositing of a moving subject.

Any Image Can Be A New Background

In some embodiments, an initial illumination associated with the image may be different from the target illumination. The disclosed technique assumes that an HDR lighting environment corresponding to a desired background imagery is available. This may be achieved in practice by generating background plates via perspective projection of high-resolution, HDR panoramas. However, this assumption may not be applicable in conjunction with in-the-wild backgrounds, where illumination is typically unknown. For example, in some embodiments, the target illumination may not be based on controlled lighting. However, the disclosed technique can be modified by estimating the illumination from any arbitrary image with a field-of-view similar to smartphone video.

Some embodiments involve identifying a target background. The target illumination may be associated with the target background. The predicting of the output image may involve compositing the relit foreground into the target background using an alpha matte.

Figure 17:
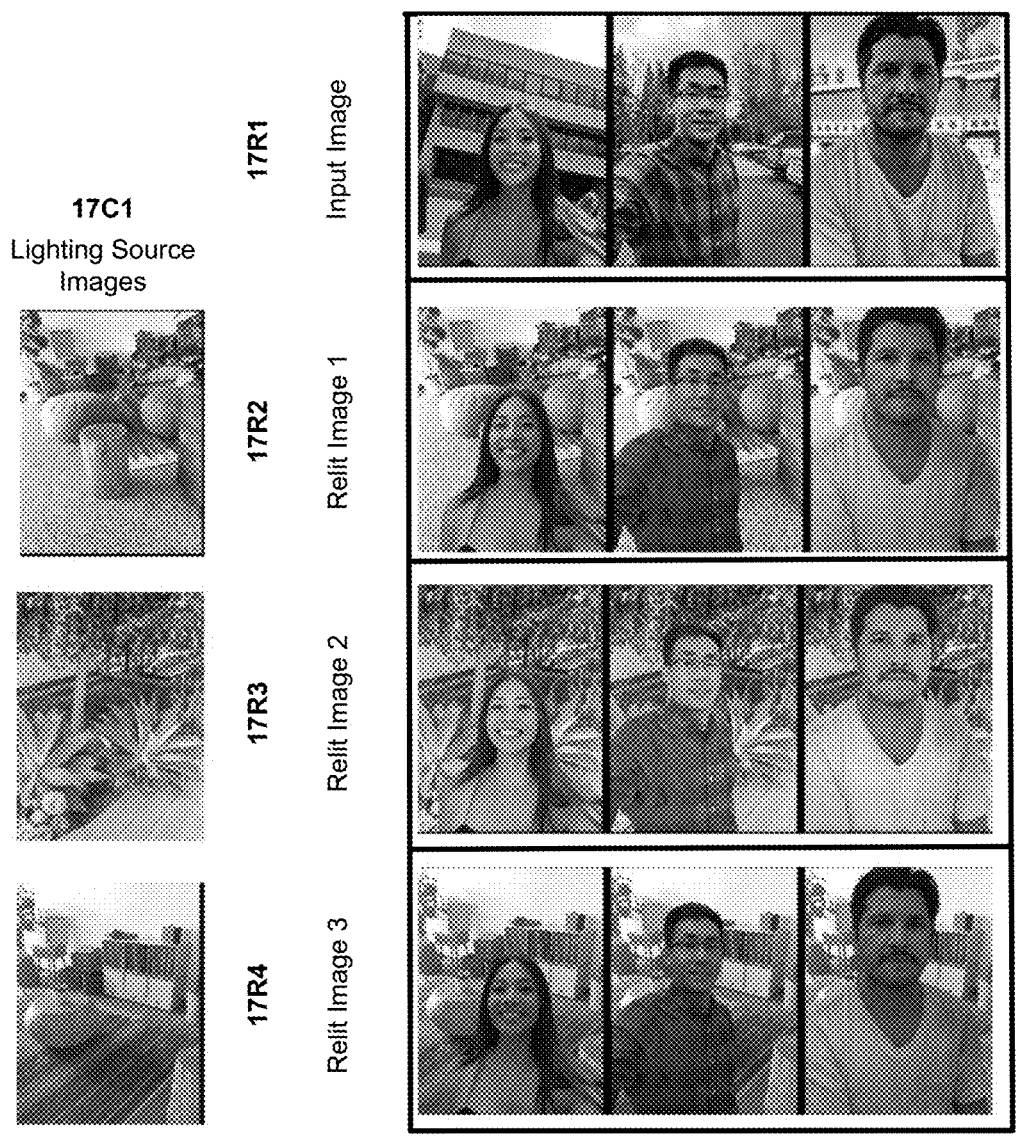
FIG. 17 illustrates example relit images based on input background images, in accordance with example embodiments.

FIG. 17 illustrates example relit images based on input background images, in accordance with example embodiments. For example, column 17C1 displays three different input background images as lighting source images. Row 17R1 displays three different subjects in respective initial backgrounds. Each of rows 17R2, 17R3 and 17R4 displays respective relit images with each subject in row 17R1 composited into target background corresponding to the images in column 17C1, with a foreground lighting based on the lighting from the background in the respective images in column 17C1, and with consistent illumination.

Image Lighting Transfer

In another application, lighting may be transferred from one image to another. For example, illumination from a first image can be estimated, and then the estimated illumination can be applied to a different image, with consistent illumination.

Material Editing

The per-pixel lighting representation described herein offers some control over the material properties of a subject during neural rendering. To demonstrate this effect, Phong exponents used to pre-filter the HDR lighting environments can be artificially adjusted at inference time (not during training). An example of this technique is shine removal in captured images.

Training Machine Learning Models for Generating Inferences/Predictions

Figure 18:
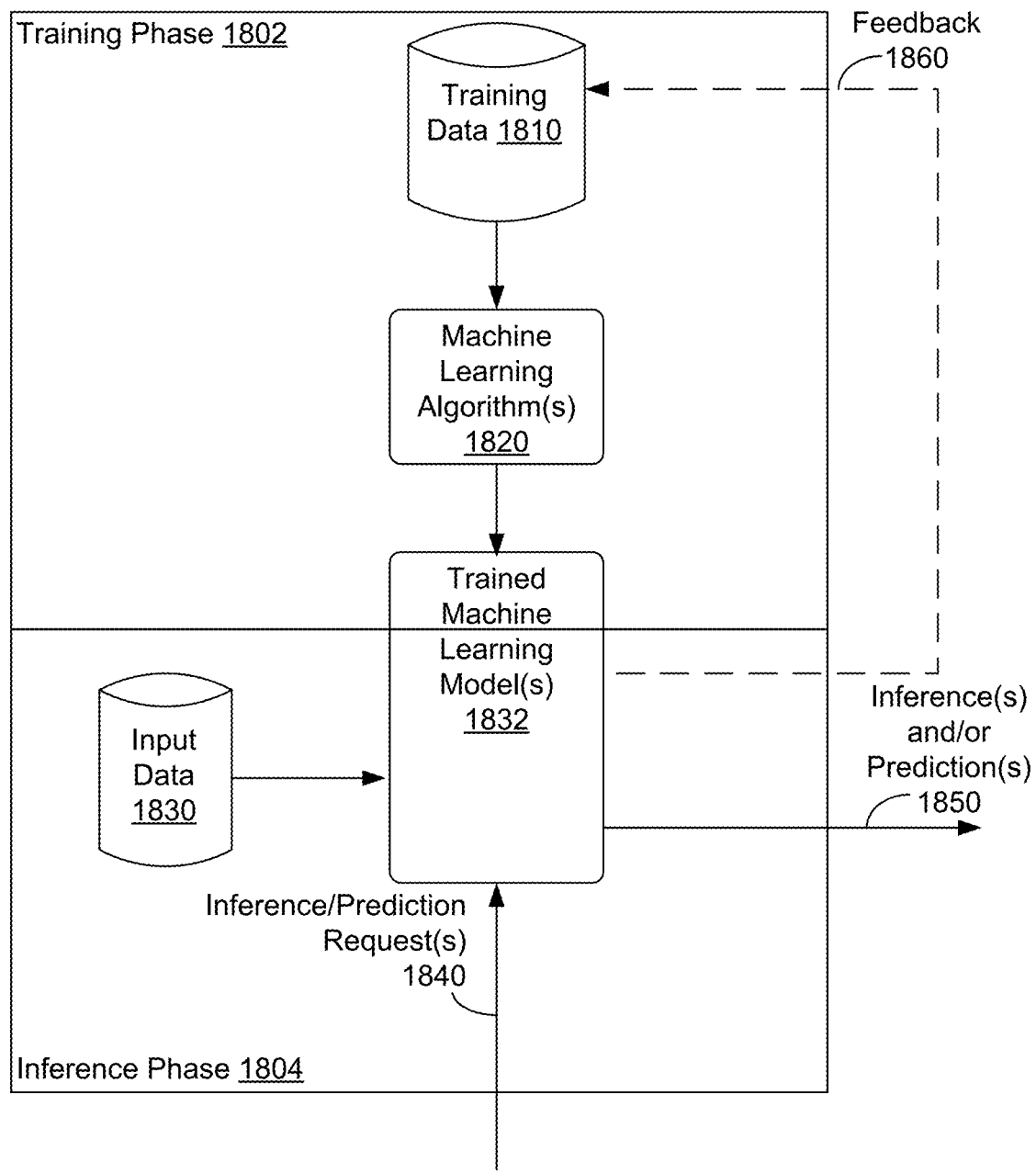
FIG. 18 is a diagram illustrating training and inference phases of a machine learning model, in accordance with example embodiments.

FIG. 18 shows diagram 1800 illustrating a training phase 1802 and an inference phase 1804 of trained machine learning model(s) 1832, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 18 shows training phase 1802 where one or more machine learning algorithms 1820 are being trained on training data 1810 to become trained machine learning model 1832. Then, during inference phase 1804, trained machine learning model 1832 can receive input data 1830 and one or more inference/prediction requests 1840 (perhaps as part of input data 1830) and responsively provide as an output one or more inferences and/or predictions 1850.

As such, trained machine learning model(s) 1832 can include one or more models of one or more machine learning algorithms 1820. Machine learning algorithm(s) 1820 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1820 may be supervised or unsupervised, and may implement any suitable combination of online and offline learning.

In some examples, machine learning algorithm(s) 1820 and/or trained machine learning model(s) 1832 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1820 and/or trained machine learning model(s) 1832. In some examples, trained machine learning model(s) 1832 can be trained, reside and execute to provide inferences on a particular computing device, and/or otherwise can make inferences for the particular computing device.

During training phase 1802, machine learning algorithm(s) 1820 can be trained by providing at least training data 1810 as training input using unsupervised, supervised, semi-supervised, and/or reinforcement learning techniques. Unsupervised learning involves providing a portion (or all) of training data 1810 to machine learning algorithm(s) 1820 and machine learning algorithm(s) 1820 determining one or more output inferences based on the provided portion (or all) of training data 1810. Supervised learning involves providing a portion of training data 1810 to machine learning algorithm(s) 1820, with machine learning algorithm(s) 1820 determining one or more output inferences based on the provided portion of training data 1810, and the output inference(s) are either accepted or corrected based on correct results associated with training data 1810. In some examples, supervised learning of machine learning algorithm(s) 1820 can be governed by a set of rules and/or a set of labels for the training input, and the set of rules and/or set of labels may be used to correct inferences of machine learning algorithm(s) 1820.

Semi-supervised learning involves having correct results for part, but not all, of training data 1810. During semi-supervised learning, supervised learning is used for a portion of training data 1810 having correct results, and unsupervised learning is used for a portion of training data 1810 not having correct results. Reinforcement learning involves machine learning algorithm(s) 1820 receiving a reward signal regarding a prior inference, where the reward signal can be a numerical value. During reinforcement learning, machine learning algorithm(s) 1820 can output an inference and receive a reward signal in response, where machine learning algorithm(s) 1820 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1820 and/or trained machine learning model(s) 1832 can be trained using other machine learning techniques, including but not limited to, incremental learning and curriculum learning.

In some examples, machine learning algorithm(s) 1820 and/or trained machine learning model(s) 1832 can use transfer learning techniques. For example, transfer learning techniques can involve trained machine learning model(s) 1832 being pre-trained on one set of data and additionally trained using training data 1810. More particularly, machine learning algorithm(s) 1820 can be pre-trained on data from one or more computing devices and a resulting trained machine learning model provided to a particular computing device, where the particular computing device is intended to execute the trained machine learning model during inference phase 1804. Then, during training phase 1802, the pre-trained machine learning model can be additionally trained using training data 1810, where training data 1810 can be derived from kernel and non-kernel data of the particular computing device. This further training of the machine learning algorithm(s) 1820 and/or the pre-trained machine learning model using training data 1810 of the particular computing device's data can be performed using either supervised or unsupervised learning. Once machine learning algorithm(s) 1820 and/or the pre-trained machine learning model has been trained on at least training data 1810, training phase 1802 can be completed. The trained resulting machine learning model can be utilized as at least one of trained machine learning model(s) 1832.

In particular, once training phase 1802 has been completed, trained machine learning model(s) 1832 can be provided to a computing device, if not already on the computing device. Inference phase 1804 can begin after trained machine learning model(s) 1832 are provided to the particular computing device.

During inference phase 1804, trained machine learning model(s) 1832 can receive input data 1830 and generate and output one or more corresponding inferences and/or predictions 1850 about input data 1830. As such, input data 1830 can be used as an input to trained machine learning model(s) 1832 for providing corresponding inference(s) and/or prediction(s) 1850 to kernel components and non-kernel components. For example, trained machine learning model(s) 1832 can generate inference(s) and/or prediction(s) 1850 in response to one or more inference/prediction requests 1840. In some examples, trained machine learning model(s) 1832 can be executed by a portion of other software. For example, trained machine learning model(s) 1832 can be executed by an inference or prediction daemon to be readily available to provide inferences and/or predictions upon request. Input data 1830 can include data from the particular computing device executing trained machine learning model(s) 1832 and/or input data from one or more computing devices other than CD1.

Input data 1830 can include a collection of images provided by one or more sources. The collection of images can include images of an object, such as a human face, where the images of the human face are taken under different lighting conditions, images of multiple objects, images resident on the particular computing device, and/or other images. Other types of input data are possible as well.

Inference(s) and/or prediction(s) 1850 can include output foregrounds, alpha mattes, albedos, surface normals, diffuse and specular light maps, numerical values, and/or other output data produced by trained machine learning model(s) 1832 operating on input data 1830 (and training data 1810). In some examples, trained machine learning model(s) 1832 can use output inference(s) and/or prediction(s) 1850 as input feedback 1860. Trained machine learning model(s) 1832 can also rely on past inferences as inputs for generating new inferences.

Convolutional neural networks 210, 220, 260, 420, 435, 600, 710, 740 can be examples of machine learning algorithm(s) 1820. After training, the trained version of convolutional neural networks 210, 220, 260, 420, 435, 600, 710, 740 can be examples of trained machine learning model(s) 1832. In this approach, an example of inference/prediction request(s) 1840 can be a request to predict a surface normal from an input image of an object and a corresponding example of inferences and/or prediction(s) 1850 can be an output surface normal. As another example, an example of inference/prediction request(s) 1840 can be a request to predict an albedo from an input image of an object and a corresponding example of inferences and/or prediction(s) 1850 can be an output albedo. Also, for example, an example of inference/prediction request(s) 1840 can be a request to determine a foreground for an input image of an object and a corresponding example of inferences and/or prediction(s) 1850 can be an output image that predicts the foreground.

In some examples, a given computing device can include the trained version of convolutional neural networks 210, 220, 260, 420, 435, 600, 710, 740, perhaps after training convolutional neural networks 210, 220, 260, 420, 435, 600, 710, 740. Then, the given computing device can receive requests to predict surface orientation maps from corresponding input images, and use the trained version of convolutional neural networks 210, 220, 260, 420, 435, 600, 710, 740 to generate output images.

In some examples, two or more computing devices can be used to provide output images; e.g., a first computing device can generate and send requests to apply a target background to input images to a second computing device. Then, the second computing device can use the trained versions of convolutional neural networks 210, 220, 260, 420, 435, 600, 710, 740, perhaps after training convolutional neural networks 210, 220, 260, 420, 435, 600, 710, 740, to generate output images that composite the input foreground into the target background, and respond to the requests from the first computing device for the output images. Then, upon reception of responses to the requests, the first computing device can provide the requested output images (e.g., using a user interface and/or a display, a printed copy, an electronic communication, etc.).

Example Data Network

Figure 19:
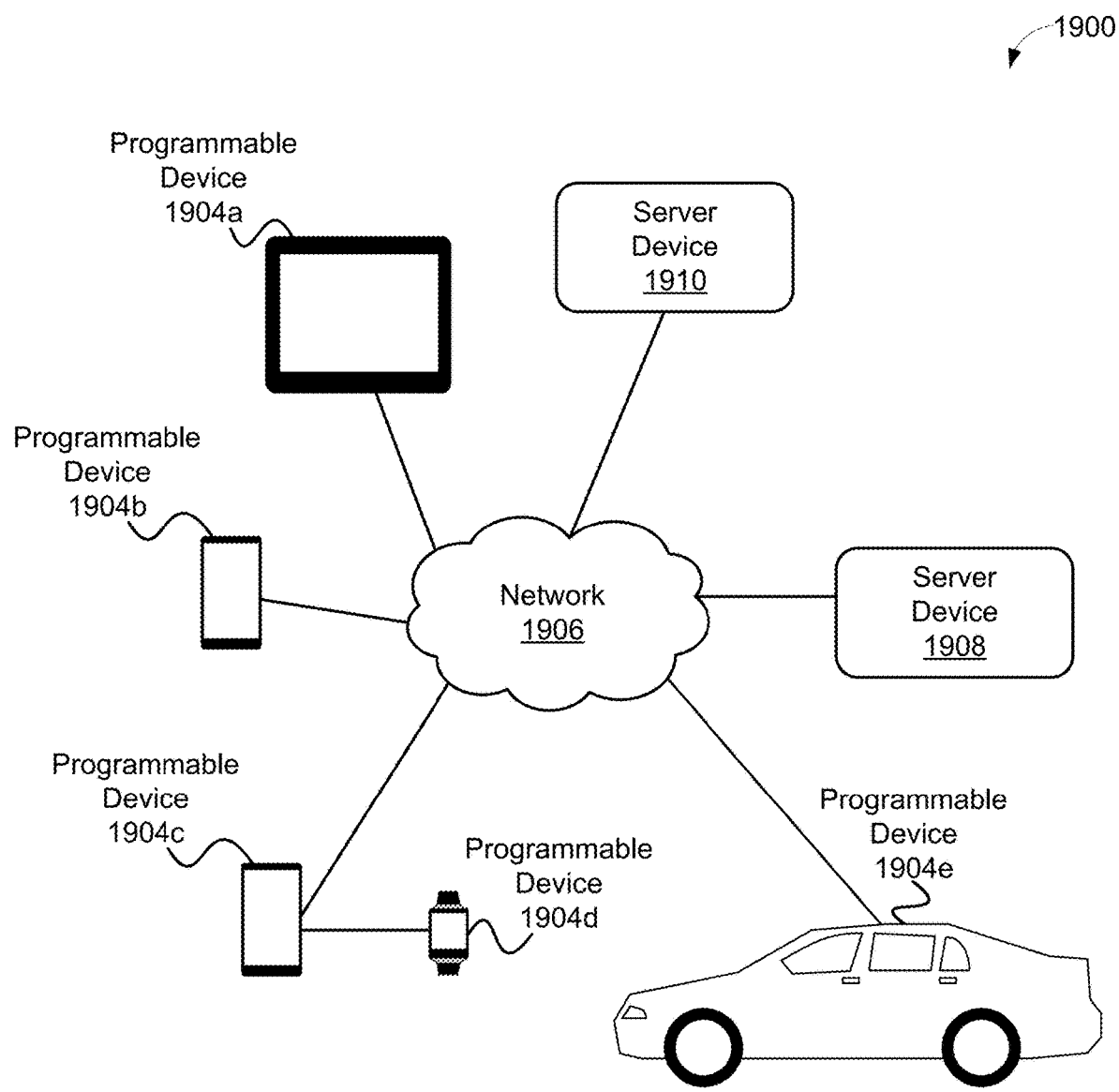
FIG. 19 depicts a distributed computing architecture, in accordance with example embodiments.

FIG. 19 depicts a distributed computing architecture 1900, in accordance with example embodiments. Distributed computing architecture 1900 includes server devices 1908, 1910 that are configured to communicate, via network 1906, with programmable devices 1904a, 1904b, 1904c, 1904d, 1904e. Network 1906 may correspond to a local area network (LAN), a wide area network (WAN), a WLAN, a WWAN, a corporate intranet, the public Internet, or any other type of network configured to provide a communications path between networked computing devices. Network 1906 may also correspond to a combination of one or more LANs, WANs, corporate intranets, and/or the public Internet.

Although FIG. 19 only shows five programmable devices, distributed application architectures may serve tens, hundreds, or thousands of programmable devices. Moreover, programmable devices 1904a, 1904b, 1904c, 1904d, 1904e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1904a, 1904b, 1904c, 1904e, programmable devices can be directly connected to network 1906. In other examples, such as illustrated by programmable device 1904d, programmable devices can be indirectly connected to network 1906 via an associated computing device, such as programmable device 1904c. In this example, programmable device 1904c can act as an associated computing device to pass electronic communications between programmable device 1904d and network 1906. In other examples, such as illustrated by programmable device 1904e, a computing device can be part of and/or inside a vehicle, such as a car, a truck, a bus, a boat or ship, an airplane, etc. In other examples not shown in FIG. 19, a programmable device can be both directly and indirectly connected to network 1906.

Server devices 1908, 1910 can be configured to perform one or more services, as requested by programmable devices 1904a-1904e. For example, server device 1908 and/or 1910 can provide content to programmable devices 1904a-1904e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server devices 1908 and/or 1910 can provide programmable devices 1904a-1904e with access to software for database, search, computation, graphical, audio, video, World Wide Web/Internet utilization, and/or other functions. Many other examples of server devices are possible as well.

Computing Device Architecture

Figure 20:
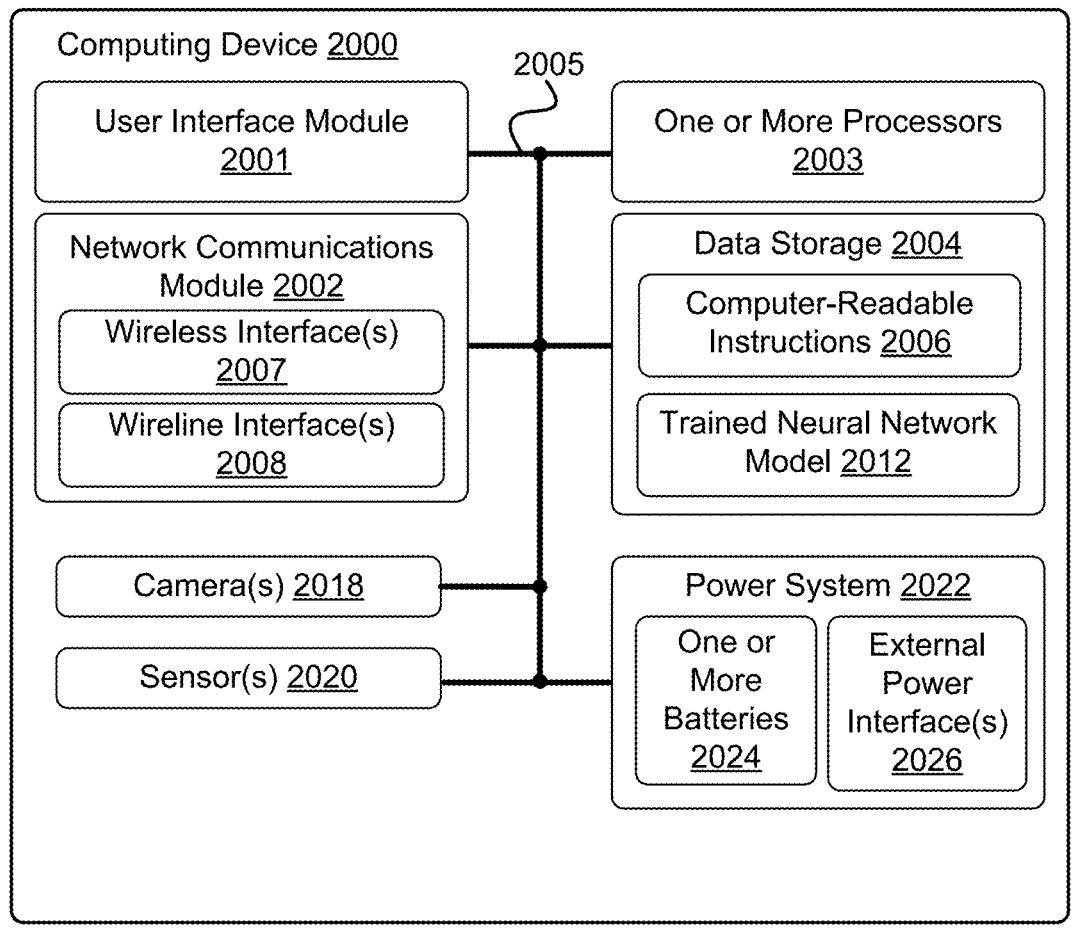
FIG. 20 is a block diagram of a computing device, in accordance with example embodiments.

FIG. 20 is a block diagram of an example computing device 2000, in accordance with example embodiments. In particular, computing device 2000 shown in FIG. 20 can be configured to perform at least one function of and/or related to convolutional neural networks 210, 220, 260, 420, 435, 600, 710, 740, and/or method 2200.

Computing device 2000 may include a user interface module 2001, a network communications module 2002, one or more processors 2003, data storage 2004, one or more cameras 2018, one or more sensors 2020, and power system 2022, all of which may be linked together via a system bus, network, or other connection mechanism 2005.

User interface module 2001 can be operable to send data to and/or receive data from external user input/output devices. For example, user interface module 2001 can be configured to send and/or receive data to and/or from user input devices such as a touch screen, a computer mouse, a keyboard, a keypad, a touch pad, a trackball, a joystick, a voice recognition module, and/or other similar devices. User interface module 2001 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 2001 can also be configured to generate audible outputs, with devices such as a speaker, speaker jack, audio output port, audio output device, earphones, and/or other similar devices. User interface module 2001 can further be configured with one or more haptic devices that can generate haptic outputs, such as vibrations and/or other outputs detectable by touch and/or physical contact with computing device 2000. In some examples, user interface module 2001 can be used to provide a graphical user interface (GUI) for utilizing computing device 2000.

Network communications module 2002 can include one or more devices that provide one or more wireless interfaces 2007 and/or one or more wireline interfaces 2008 that are configurable to communicate via a network. Wireless interface(s) 2007 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 2008 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 2002 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 2003 can include one or more general purpose processors, and/or one or more special purpose processors (e.g., digital signal processors, tensor processing units (TPUs), graphics processing units (GPUs), application specific integrated circuits, etc.). One or more processors 2003 can be configured to execute computer-readable instructions 2006 that are contained in data storage 2004 and/or other instructions as described herein.

Data storage 2004 can include one or more non-transitory computer-readable storage media that can be read and/or accessed by at least one of one or more processors 2003. The one or more computer-readable storage media can include volatile and/or non-volatile storage components, such as optical, magnetic, organic or other memory or disc storage, which can be integrated in whole or in part with at least one of one or more processors 2003. In some examples, data storage 2004 can be implemented using a single physical device (e.g., one optical, magnetic, organic or other memory or disc storage unit), while in other examples, data storage 2004 can be implemented using two or more physical devices.

Data storage 2004 can include computer-readable instructions 2006 and perhaps additional data. In some examples, data storage 2004 can include storage required to perform at least part of the herein-described methods, scenarios, and techniques and/or at least part of the functionality of the herein-described devices and networks. In some examples, data storage 2004 can include storage for a trained neural network model 2012 (e.g., a model of trained convolutional neural networks such as convolutional neural networks 210, 220, 260, 420, 435, 600, 710, 740). In particular of these examples, computer-readable instructions 2006 can include instructions that, when executed by processor(s) 2003, enable computing device 2000 to provide for some or all of the functionality of trained neural network model 2012.

In some examples, computing device 2000 can include one or more cameras 2018. Camera(s) 2018 can include one or more image capture devices, such as still and/or video cameras, equipped to capture light and record the captured light in one or more images; that is, camera(s) 2018 can generate image(s) of captured light. The one or more images can be one or more still images and/or one or more images utilized in video imagery. Camera(s) 2018 can capture light and/or electromagnetic radiation emitted as visible light, infrared radiation, ultraviolet light, and/or as one or more other frequencies of light.

In some examples, computing device 2000 can include one or more sensors 2020. Sensors 2020 can be configured to measure conditions within computing device 2000 and/or conditions in an environment of computing device 2000 and provide data about these conditions. For example, sensors 2020 can include one or more of: (i) sensors for obtaining data about computing device 2000, such as, but not limited to, a thermometer for measuring a temperature of computing device 2000, a battery sensor for measuring power of one or more batteries of power system 2022, and/or other sensors measuring conditions of computing device 2000; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 2000, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 2000, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 2000, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 2020 are possible as well.

Power system 2022 can include one or more batteries 2024 and/or one or more external power interfaces 2026 for providing electrical power to computing device 2000. Each battery of the one or more batteries 2024 can, when electrically coupled to the computing device 2000, act as a source of stored electrical power for computing device 2000. One or more batteries 2024 of power system 2022 can be configured to be portable. Some or all of one or more batteries 2024 can be readily removable from computing device 2000. In other examples, some or all of one or more batteries 2024 can be internal to computing device 2000, and so may not be readily removable from computing device 2000. Some or all of one or more batteries 2024 can be rechargeable. For example, a rechargeable battery can be recharged via a wired connection between the battery and another power supply, such as by one or more power supplies that are external to computing device 2000 and connected to computing device 2000 via the one or more external power interfaces. In other examples, some or all of one or more batteries 2024 can be non-rechargeable batteries.

One or more external power interfaces 2026 of power system 2022 can include one or more wired-power interfaces, such as a USB cable and/or a power cord, that enable wired electrical power connections to one or more power supplies that are external to computing device 2000. One or more external power interfaces 2026 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 2026, computing device 2000 can draw electrical power from the external power source the established electrical power connection. In some examples, power system 2022 can include related sensors, such as battery sensors associated with one or more batteries or other types of electrical power sensors.

Cloud-Based Servers

Figure 21:
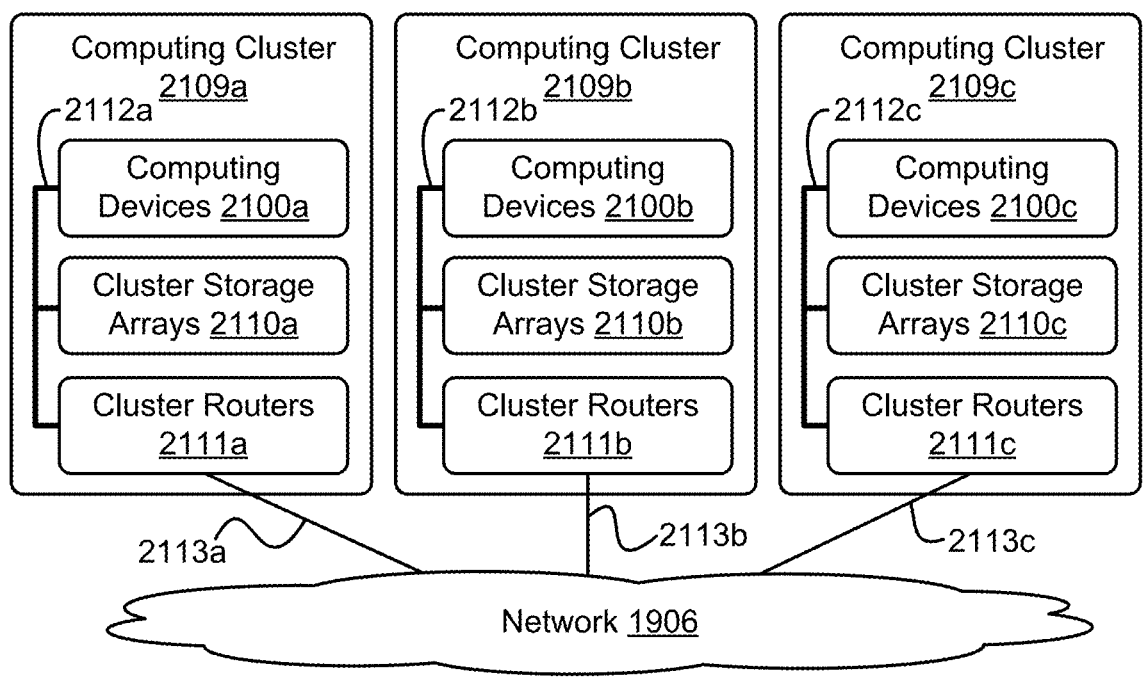
FIG. 21 depicts a network of computing clusters arranged as a cloud-based server system, in accordance with example embodiments.

FIG. 21 depicts a network 1906 of computing clusters 2109a, 2109b, 2109c arranged as a cloud-based server system in accordance with an example embodiment. Computing clusters 2109a, 2109b, and 2109c can be cloud-based devices that store program logic and/or data of cloud-based applications and/or services; e.g., perform at least one function of and/or related to convolutional neural networks 210, 220, 260, 420, 435, 600, 710, 740, and/or method 2200.

In some embodiments, computing clusters 2109a, 2109b, and 2109c can be a single computing device residing in a single computing center. In other embodiments, computing clusters 2109a, 2109b, and 2109c can include multiple computing devices in a single computing center, or even multiple computing devices located in multiple computing centers located in diverse geographic locations. For example, FIG. 21 depicts each of computing clusters 2109a, 2109b, and 2109c residing in different physical locations.

In some embodiments, data and services at computing clusters 2109a, 2109b, 2109c can be encoded as computer readable information stored in non-transitory, tangible computer readable media (or computer readable storage media) and accessible by other computing devices. In some embodiments, computing clusters 2109a, 2109b, 2109c can be stored on a single disk drive or other tangible storage media, or can be implemented on multiple disk drives or other tangible storage media located at one or more diverse geographic locations.

In FIG. 21, functionality of convolutional neural networks 210, 220, 260, 420, 435, 600, 710, 740, and/or a computing device can be distributed among computing clusters 2109a, 2109b, 2109c. Computing cluster 2109a can include one or more computing devices 2100a, cluster storage arrays 2110a, and cluster routers 2111a connected by a local cluster network 2112a. Similarly, computing cluster 2109b can include one or more computing devices 2100b, cluster storage arrays 2110b, and cluster routers 2111b connected by a local cluster network 2112b. Likewise, computing cluster 2109c can include one or more computing devices 2100c, cluster storage arrays 2110c, and cluster routers 2111c connected by a local cluster network 2112c.

In some embodiments, each of computing clusters 2109a, 2109b, and 2109c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 2109a, for example, computing devices 2100a can be configured to perform various computing tasks of convolutional neural network, and/or a computing device. In one embodiment, the various functionalities of a convolutional neural network, and/or a computing device can be distributed among one or more of computing devices 2100a, 2100b, and 2100c. Computing devices 2100b and 2100c in respective computing clusters 2109b and 2109c can be configured similarly to computing devices 2100a in computing cluster 2109a. On the other hand, in some embodiments, computing devices 2100a, 2100b, and 2100c can be configured to perform different functions.

In some embodiments, computing tasks and stored data associated with a convolutional neural networks, and/or a computing device can be distributed across computing devices 2100a, 2100b, and 2100c based at least in part on the processing requirements of convolutional neural networks, and/or a computing device, the processing capabilities of computing devices 2100a, 2100b, 2100c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 2110a, 2110b, 2110c of computing clusters 2109a, 2109b, and 2109c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of convolutional neural networks, and/or a computing device can be distributed across computing devices 2100a, 2100b, 2100c of computing clusters 2109a, 2109b, 2109c, various active portions and/or backup portions of these components can be distributed across cluster storage arrays 2110a, 2110b, 2110c. For example, some cluster storage arrays can be configured to store one portion of the data of a convolutional neural network, and/or a computing device, while other cluster storage arrays can store other portion(s) of data of a convolutional neural network, and/or a computing device. Also, for example, some cluster storage arrays can be configured to store the data of a first convolutional neural network, while other cluster storage arrays can store the data of a second and/or third convolutional neural network. Additionally, some cluster storage arrays can be configured to store backup versions of data stored in other cluster storage arrays.

Cluster routers 2111a, 2111b, 2111c in computing clusters 2109a, 2109b, and 2109c can include networking equipment configured to provide internal and external communications for the computing clusters. For example, cluster routers 2111a in computing cluster 2109a can include one or more internet switching and routing devices configured to provide (i) local area network communications between computing devices 2100a and cluster storage arrays 2110a via local cluster network 2112a, and (ii) wide area network communications between computing cluster 2109a and computing clusters 2109b and 2109c via wide area network link 2113a to network 1906. Cluster routers 2111b and 2111c can include network equipment similar to cluster routers 2111a, and cluster routers 2111b and 2111c can perform similar networking functions for computing clusters 2109b and 2109b that cluster routers 2111a perform for computing cluster 2109a.

In some embodiments, the configuration of cluster routers 2111a, 2111b, 2111c can be based at least in part on the data communication requirements of the computing devices and cluster storage arrays, the data communications capabilities of the network equipment in cluster routers 2111a, 2111b, 2111c, the latency and throughput of local cluster networks 2112a, 2112b, 2112c, the latency, throughput, and cost of wide area network links 2113a, 2113b, 2113c, and/or other factors that can contribute to the cost, speed, fault-tolerance, resiliency, efficiency and/or other design criteria of the moderation system architecture.

Example Methods of Operation

FIG. 22 is a flowchart of a method 2200, in accordance with example embodiments. Method 2200 can be executed by a computing device, such as computing device 2000. Method 2200 can begin at block 2210, where the method involves receiving, via a computing device, an image comprising a subject.

At block 2220, the method further involves relighting, via a neural network, a foreground of the image to maintain a consistent lighting of the foreground with a target illumination, such as discussed above at least in the context of FIGS. 2-7. The relighting is based on a per-pixel light representation indicative of a surface geometry of the foreground. The light representation includes a specular component, and a diffuse component, of surface reflection.

At block 2230, the method also involves predicting, via the neural network, an output image comprising the subject in the relit foreground, such as discussed above at least in the context of FIGS. 1-8, 16, 17.

Some embodiments involve predicting, via the neural network, a reflectance field indicative of an appearance of the subject.

Some embodiments involve predicting, via the neural network and based on the foreground and the surface geometry, a per-pixel albedo image.

Some embodiments involve pre-filtering the target illumination. The pre-filtering may be based on a convolved specular light map and a convolved diffuse light map. The specular component and the diffuse component of the surface reflection may be determined by sampling the convolved specular light map and the convolved diffuse light map by using one or more of a surface normal or a reflection vector.

Some embodiments involve receiving, as input to the neural network, a plurality of candidate light maps, an albedo, and an initial foreground. Such embodiments may also involve predicting, via the neural network, the specular component of the per-pixel lighting representation. In such embodiments, the relighting of the foreground may further involve concatenating the specular component, the diffuse component, and the albedo. Such embodiments may also involve predicting, via the neural network, the relighting of the foreground based on the concatenating.

Some embodiments involve estimating, via the neural network, the foreground of the image. In such embodiments, the estimating of the foreground may involve estimating an alpha matte.

In some embodiments, the relighting of the foreground involves inferring one or more of a low-frequency color or a shading under the target illumination.

Some embodiments involve predicting, via the neural network, a plurality of per-pixel surface normal representation.

In some embodiments, an initial illumination associated with the image may be different from the target illumination.

In some embodiments, the target illumination may not be based on controlled lighting.

Some embodiments involve identifying a target background. The target illumination may be associated with the target background. The predicting of the output image may involve compositing the relit foreground into the target background using an alpha matte.

In some embodiments, the image may include the subject in an initial background that is different from the target background.

Some embodiments involve receiving a second input image including a second subject in a second initial background. Such embodiments also involve relighting a second foreground of the second image based on the target illumination. Such embodiments further involve compositing the relit foreground, the second relit foreground and the target background. The output image may include the subject and the second subject in the target background.

Some embodiments involve training the neural network to receive a particular input image including a particular subject, and predict a particular output image comprising the particular subject in a relit foreground. In such embodiments, the training of the neural network may include training a ground truth alpha matte generation model.

In some embodiments, a training dataset may include a plurality of images including subjects captured in a light stage computational illumination system. The computational illumination system may record one or more of: (i) a plurality of lighting conditions, (ii) a plurality of reflectance fields indicative of surface reflectance and surface geometry, or (iii) a plurality of alpha mattes.

Additional Example Embodiments

The following clauses are offered as further description of the disclosure.

Clause 1—A computer-implemented method, including: receiving, via a computing device, an image comprising a subject; relighting, via a neural network, a foreground of the image to maintain a consistent lighting of the foreground with a target illumination, wherein the relighting is based on a per-pixel light representation indicative of a surface geometry of the foreground, and wherein the light representation comprises a specular component, and a diffuse component, of surface reflection; and predicting, via the neural network, an output image comprising the subject in the relit foreground.

Clause 2—The computer-implemented method of clause 1, further including: predicting, via the neural network, a reflectance field indicative of an appearance of the subject.

Clause 3—The computer-implemented method of clauses 1 or 2, wherein predicting, via the neural network and based on the foreground and the surface geometry, a per-pixel albedo image.

Clause 4—The computer-implemented method of any one of clauses 1-3, further including: pre-filtering the target illumination, wherein the pre-filtering is based on a convolved specular light map and a convolved diffuse light map. The specular component and the diffuse component of the surface reflection are determined by sampling the convolved specular light map and the convolved diffuse light map by using one or more of a surface normal or a reflection vector.

Clause 5—The computer-implemented method of any one of clauses 1-4, further including: receiving, as input to the neural network, a plurality of candidate light maps, an albedo, and an initial foreground; and predicting, via the neural network, the specular component of the per-pixel lighting representation.

Clause 6—The computer-implemented method of clause 5, wherein the relighting of the foreground further including: concatenating the specular component, the diffuse component, and the albedo; and predicting, via the neural network, the relighting of the foreground based on the concatenating.

Clause 7—The computer-implemented method of any one of clauses 1-6, further including: estimating, via the neural network, the foreground of the image.

Clause 8—The computer-implemented method of any one of clauses 1-7, wherein estimating of the foreground comprises estimating an alpha matte.

Clause 9—The computer-implemented method of any one of clauses 1-8, wherein the relighting of the foreground includes inferring one or more of a low-frequency color or a shading under the target illumination.

Clause 10—The computer-implemented method of any one of clauses 1-9, further including: predicting, via the neural network, a plurality of per-pixel surface normal representation.

Clause 11—The computer-implemented method of any one of clauses 1-10, wherein an initial illumination associated with the image is different from the target illumination.

Clause 12—The computer-implemented method of any one of clauses 1-11, wherein the target illumination is not based on controlled lighting.

Clause 13—The computer-implemented method of any one of clauses 1-12, further including: identifying a target background, wherein the target illumination is associated with the target background. The predicting of the output image includes compositing the relit foreground into the target background using an alpha matte.

Clause 14—The computer-implemented method of any one of clauses 1-13, wherein the image includes the subject in an initial background that is different from the target background.

Clause 15—The computer-implemented method of any one of clauses 1-14, further including: receiving a second input image including a second subject in a second initial background; relighting a second foreground of the second image based on the target illumination; and compositing the relit foreground, the second relit foreground and the target background. The output image includes the subject and the second subject in the target background.

Clause 16—The computer-implemented method of any one of clauses 1-15, further including: training the neural network to receive a particular input image including a particular subject, and predict a particular output image comprising the particular subject in a relit foreground.

Clause 17—The computer-implemented method of clause 16, wherein the training of the neural network includes training a ground truth alpha matte generation model.

Clause 18—The computer-implemented method of clauses 16 or 17, wherein a training dataset includes a plurality of images including subjects captured in a light stage computational illumination system. The computational illumination system records one or more of: (i) a plurality of lighting conditions, (ii) a plurality of reflectance fields indicative of surface reflectance and surface geometry, or (iii) a plurality of alpha mattes.

Clause 19—A computing device, including: one or more processors; and data storage, wherein the data storage has stored thereon computer-executable instructions that, when executed by the one or more processors, cause the computing device to carry out functions including the computer-implemented method of any one of clauses 1-18.

Clause 20—An article of manufacture including one or more computer readable media having computer-readable instructions stored thereon that, when executed by one or more processors of a computing device, cause the computing device to carry out functions that comprise the computer-implemented method of any one of clauses 1-18.

Clause 21—The article of manufacture of clause 20, wherein the one or more computer readable media comprise one or more non-transitory computer readable media.

Clause 22—A computing device, including: means for carrying out the computer-implemented method of any one of clauses 1-18.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A computer-implemented method, comprising:
   receiving, by a computing device, an image comprising a subject;
   relighting, by a neural network, a foreground of the image to maintain a consistent lighting of the foreground with a target illumination, wherein the relighting is based on a per-pixel light representation indicative of a surface geometry of the foreground, and wherein the light representation comprises a specular component, and a diffuse component, of surface reflection, and wherein the relighting comprises:
      pre-filtering the target illumination to generate a plurality of candidate specular light maps,
      predicting, by a specular net of the neural network, a per-pixel weight image based on the plurality of candidate specular light maps, and
      generating a blended specular light map by taking a weighted sum of the plurality of candidate specular light maps using the per-pixel weight image; and
   predicting, by the neural network, an output image comprising the subject in a relit foreground.

2. The computer-implemented method of claim 1, further comprising:
   predicting, via the neural network, a reflectance field indicative of an appearance of the subject.

3. The computer-implemented method of claim 1, further comprising:
   predicting, via the neural network and based on the foreground and the surface geometry, a per-pixel albedo image.

4. The computer-implemented method of claim 1, further comprising:
   pre-filtering the target illumination, wherein the pre-filtering is based on a convolved specular light map and a convolved diffuse light map, and
   wherein the specular component and the diffuse component of the surface reflection are determined by sampling the convolved specular light map and the convolved diffuse light map by using one or more of a surface normal or a reflection vector.

5. The computer-implemented method of claim 1, further comprising:
   receiving, as input to the neural network, the plurality of candidate light maps, an albedo, and an initial foreground; and
   predicting, via the neural network, the specular component of the per-pixel lighting representation.

6. The computer-implemented method of claim 5, wherein the relighting of the foreground further comprises:
   concatenating the specular component, the diffuse component, and the albedo; and
   predicting, via the neural network, the relighting of the foreground based on the concatenating.

7. The computer-implemented method of claim 1, further comprising:
   estimating, via the neural network, the foreground of the image.

8. The computer-implemented method of claim 7, wherein the estimating of the foreground comprises estimating an alpha matte.

9. The computer-implemented method of claim 1, wherein the relighting of the foreground comprises inferring one or more of a low-frequency color or a shading under the target illumination.

10. The computer-implemented method of claim 1, further comprising:
predicting, via the neural network, a plurality of per-pixel surface normal representations.

11. The computer-implemented method of claim 1, wherein an initial illumination associated with the image is different from the target illumination.

12. The computer-implemented method of claim 1, wherein the target illumination is not based on controlled lighting.

13. The computer-implemented method of claim 1, further comprising:
identifying a target background, wherein the target illumination is associated with the target background, and wherein the predicting of the output image comprises compositing the relit foreground into the target background using an alpha matte.

14. The computer-implemented method of claim 13, wherein the image comprises the subject in an initial background that is different from the target background.

15. The computer-implemented method of claim 13, further comprising:
receiving a second input image comprising a second subject in a second initial background;
relighting a second foreground of the second image based on the target illumination; and
compositing the relit foreground, the second relit foreground and the target background, and
wherein the output image comprises the subject and the second subject in the target background.

16. The computer-implemented method of claim 1, further comprising:
training the neural network to receive a particular input image comprising a particular subject, and predict a particular output image comprising the particular subject in a relit foreground.

17. The computer-implemented method of claim 16, wherein the training of the neural network comprises training a ground truth alpha matte generation model.

18. The computer-implemented method of claim 1, wherein a training dataset comprises a plurality of images of subjects captured in a light stage computational illumination system, wherein the computational illumination system records one or more of: (i) a plurality of lighting conditions, (ii) a plurality of reflectance fields indicative of surface reflectance and surface geometry, or (iii) a plurality of alpha mattes.

19. A computing device, comprising:
one or more processors; and
data storage, wherein the data storage has stored thereon computer-executable instructions that, when executed by the one or more processors, cause the computing device to carry out functions comprising:
receiving, by the computing device, an image comprising a subject;
relighting, by a neural network, a foreground of the image to maintain a consistent lighting of the foreground with a target illumination, wherein the relighting is based on a per-pixel light representation indicative of a surface geometry of the foreground, and wherein the light representation comprises a specular component, and a diffuse component, of surface reflection, and wherein the relighting comprises:
pre-filtering the target illumination to generate a plurality of candidate specular light maps,
predicting, by a specular net of the neural network, a per-pixel weight image based on the plurality of candidate specular light maps, and
generating a blended specular light map by taking a weighted sum of the plurality of candidate specular light maps using the per-pixel weight image; and
predicting, by the neural network, an output image comprising the subject in a relit foreground.

20. An article of manufacture comprising one or more non-transitory computer readable media having computer-readable instructions stored thereon that, when executed by one or more processors of a computing device, cause the computing device to carry out functions comprising:
receiving, by the computing device, an image comprising a subject;
relighting, by a neural network, a foreground of the image to maintain a consistent lighting of the foreground with a target illumination, wherein the relighting is based on a per-pixel light representation indicative of a surface geometry of the foreground, and wherein the light representation comprises a specular component, and a diffuse component, of surface reflection, and wherein the relighting comprises:
pre-filtering the target illumination to generate a plurality of candidate specular light maps,
predicting, by a specular net of the neural network, a per-pixel weight image based on the plurality of candidate specular light maps, and
generating a blended specular light map by taking a weighted sum of the plurality of candidate specular light maps using the per-pixel weight image; and
predicting, by the neural network, an output image comprising the subject in a relit foreground.

21. The computer-implemented method of claim 1, wherein each candidate specular light map corresponds to a different Phong exponent.

* * * * *